US012485420B2

(12) United States Patent
Vyawahare et al.

(10) Patent No.: US 12,485,420 B2
(45) Date of Patent: Dec. 2, 2025

(54) SYSTEMS AND METHODS FOR MULTI-JUNCTION PARTICLE SORTING IN INJECTION-MOLDED ARTICLES

(71) Applicant: Verily Life Sciences LLC, South San Francisco, CA (US)

(72) Inventors: Saurabh Vyawahare, Mountain View, CA (US); Andrew Homyk, Belmont, CA (US); Michael Brundage, Lincoln, MA (US); Srinivas Hanasoge, Foster City, CA (US); Junjia Ding, San Mateo, CA (US)

(73) Assignee: Verily Life Sciences LLC, Dallas, TX (US)

( * ) Notice: Subject to any disclaimer, the term of this patent is extended or adjusted under 35 U.S.C. 154(b) by 778 days.

(21) Appl. No.: 17/658,781

(22) Filed: Apr. 11, 2022

(65) Prior Publication Data
US 2022/0388004 A1    Dec. 8, 2022

Related U.S. Application Data

(60) Provisional application No. 63/196,379, filed on Jun. 3, 2021.

(51) Int. Cl.
*B01L 3/00*        (2006.01)
*B29D 22/00*       (2006.01)
*G01N 15/14*       (2024.01)
*G01N 15/10*       (2024.01)
*G01N 15/149*      (2024.01)

(52) U.S. Cl.
CPC ... *B01L 3/502784* (2013.01); *B01L 3/502715* (2013.01); *B29D 22/00* (2013.01); *G01N 15/1484* (2013.01); *B01L 2200/0652* (2013.01); *B01L 2300/0645* (2013.01); *B01L 2300/0654* (2013.01); *B01L 2300/0861* (2013.01); *B01L 2300/088* (2013.01); *B01L 2400/02* (2013.01); *G01N 2015/1006* (2013.01); *G01N 15/149* (2024.01)

(58) Field of Classification Search
CPC ..... B01L 2200/0652; B01L 2300/0645; B01L 2300/0654; B01L 2300/0816; B01L 2300/0861; B01L 2300/0864; B01L 2300/088; B01L 2300/0883; B01L 2400/02; B01L 2400/0424; B01L 2400/0487; B01L 3/502715; B01L 3/502761; B01L 3/502784; B29D 22/00; B32B 1/00; G01N 15/1459; G01N 15/1484; G01N 15/149; G01N 2015/1006; G01N 2015/1402; G01N 2015/1493
See application file for complete search history.

(56) References Cited

U.S. PATENT DOCUMENTS 8,765,455 B2   7/2014   Beer
9,695,474 B2   7/2017   Johnson
(Continued)

*Primary Examiner* — Jennifer Wecker
(74) *Attorney, Agent, or Firm* — Kilpatrick Townsend & Stockton LLP

(57) ABSTRACT

The present disclosure is related to a method of producing a microfluidic sorting apparatus. The method includes providing an injection-molded substrate comprising a network of channels; bonding an insulating film to an upper surface of the substrate to cover the network of channels; and depositing a conductive film on the insulating film. The substrate can be separated from the conductive film.

27 Claims, 21 Drawing Sheets

(56) References Cited

U.S. PATENT DOCUMENTS

| | | | |
|---|---|---|---|
| 10,232,373 B2 | 3/2019 | Abate | |
| 2001/0033995 A1* | 10/2001 | Tanaka | G03F 1/30 430/311 |
| 2012/0085649 A1* | 4/2012 | Sano | B03C 5/005 204/547 |
| 2017/0010259 A1* | 1/2017 | Amoabediny | B01L 3/502 |
| 2017/0297029 A1* | 10/2017 | DeVoe | B01L 7/52 |
| 2021/0237061 A1* | 8/2021 | Kosse | B32B 27/285 |
| 2022/0105515 A1* | 4/2022 | Kvist | B01F 23/4144 |

* cited by examiner

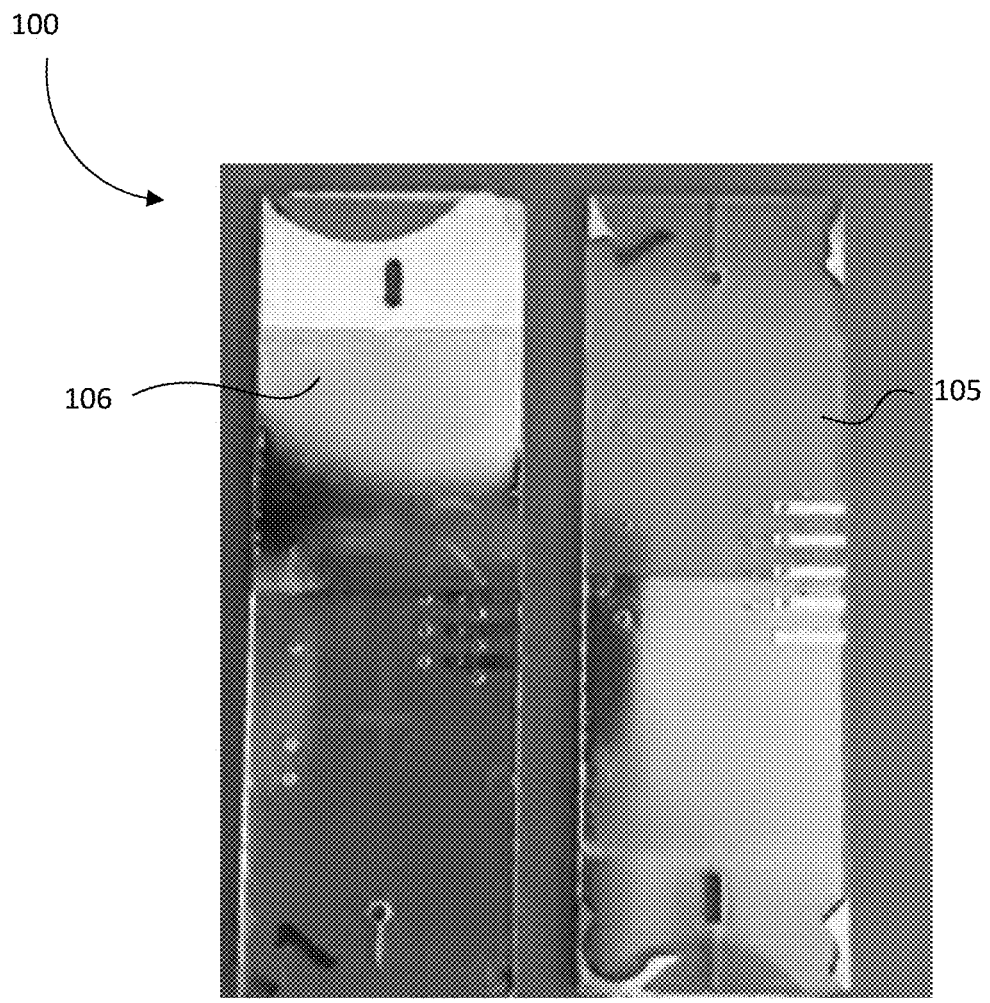
*FIG. 1A*  *FIG. 1B*

108

SYSTEMS AND METHODS FOR MULTI-JUNCTION PARTICLE SORTING IN INJECTION-MOLDED ARTICLES

CROSS-REFERENCE TO RELATED APPLICATION

This application claims the benefit of and priority to U.S. Provisional Application No. 63/196,379, filed Jun. 3, 2021, the disclosure of which is hereby incorporated by reference in its entirety.

TECHNICAL FIELD

The present disclosure generally relates to a microfluidic apparatus, system, and method for sorting particles. More particularly, the microfluidic apparatus, system, and method of the present disclosure provide injection-molded articles including a plurality of sorting junctions to sort droplets or particles within channels for high throughput particle sorting.

BACKGROUND OF THE INVENTION

Certain quantitative genetic analyses of biological tissues and organisms are performed at the single cell level. However, single cells only contain small amounts (e.g., picograms) of genetic material. Conventional methods, such as polymerase chain reaction, RNA sequencing, chromatin immunoprecipitation sequencing, or whole genome sequencing, require more genetic material than is found in a single cell and are usually performed with thousands to millions of cells. These techniques provide useful genetic information at the cell population level, but have limitations for understanding biology at the single cell level. Current biological tools also lack the capacity to assay genetic measurements in many single cells in parallel.

One method for single cell analysis is fluorescence-activated cell sorting (FACS). FACS interrogates a small volume of fluid to detect and sort biological cells present in a sample fluid. In these systems, emulsion droplets are used as isolated, highly parallelized, picoliter-scale reaction vessels. FACS find numerous applications including biomedical research for immunology, single cell analysis and molecular biology. However, conventional FACS systems are very expensive and thus are available only in centralized research facilities and major health care facilities. Additionally, due to its complexity, regular maintenance and skilled expertise are required to operate the machine, analyze data, and make reports. Another challenge in the development of FACS is the isolation of target cells downstream after detection. However, due to the physical limits of parallelization using reaction wells, FACS is only useful for analyzing hundreds of single cells, rather than hundreds of thousands of single cells. These factors add a considerable cost to the maintenance of the machine and increase the cost per test in diagnosis using conventional FACS.

Thus, a need exists for improved microfluidic particle sorting devices that can be mass produced and are relatively inexpensive.

SUMMARY OF THE INVENTION

The present disclosure relates to microfluidic devices, systems, and methods to sort volumes of fluid into a plurality of sorting outlets in an injection-molded substrate having a novel electrode geometry. In some embodiments, the microfluidic design described herein includes an injection-molded substrate having a plurality of sorting junctions to sort droplets at higher droplet rates.

Embodiments of the present disclosure include a method of producing a microfluidic sorting apparatus. The method includes providing an injection-molded substrate comprising a network of channels, bonding an insulating film to an upper surface of the substrate to cover the network of channels, and depositing a conductive film on the insulating film. The substrate can be separated from the conductive film. In some embodiments, the method includes producing an insulating film. In some embodiments, producing the insulating film comprises dissolving a polymer in a solvent, and spinning the polymer onto a glass substrate to form the insulating film. In some embodiments, the method includes peeling the insulating film from the glass substrate. In some embodiments, bonding the insulating film to the substrate comprises hot pressing the insulating film onto the substrate. In some embodiments, the insulating film comprises a polymer having a lower glass transition temperature than the substrate. In some embodiments, the substrate comprises a first cyclic olefin copolymer and the insulating film comprises a second cyclic olefin copolymer. In some embodiments, the first cyclic olefin copolymer is different from the second cyclic olefin copolymer. In some embodiments, the first cyclic olefin copolymer is the same as the second cyclic olefin copolymer. In some embodiments, providing an injection-molded substrate comprises providing a mold, depositing a cyclic olefin polymer on the mold, curing the cyclic olefin polymer to form the substrate, and removing the substrate from the mold. In some embodiments, the network of channels comprises a plurality of sort junctions, wherein each of the sort junctions are defined by a primary channel connected to a sorting outlet channel and a medium supply channel. In some embodiments, the network of channels further comprises an electrode channel adjacent each sorting channel. In some embodiments, the electrode channel comprises an ionic liquid. In some embodiments, the medium supply channel may be disposed on a side of the primary channel opposite the sorting channel.

In some embodiments, a method of sorting particles is provided. The method includes providing a microfluidic chip comprising a substrate comprising a first inlet and a second inlet, a network of channels, wherein the network of channels comprise a plurality of sort junctions, wherein each of the sort junctions are defined by a primary channel connected to a sorting outlet channel and a medium supply channel, an electrode channel adjacent the sorting outlet channel, an insulating film disposed above the network of channels of the substrate; and a conductive film disposed on the insulating film, passing a medium containing a plurality of particles through a primary channel at a selected volumetric flow rate to an optical detection sensor to sense at least a subset of the particles, and sorting the sensed subset of particles into the sorting outlet channel of one of the plurality of sorting junctions. In some embodiments, sorting comprises sorting the sensed subset of particles from the primary channel into the sorting channel. In some embodiments, the method includes further comprises reinjecting a medium devoid of particles from the medium supply channel into the primary channel, wherein the reinjection of the medium from the medium supply channel maintains the selected volumetric flow rate in the primary channel. In some embodiments, the selected volumetric flow rate controls inter-particle spacing, inter-particle timing, particle positioning, or any combination thereof, within at least the primary channel. In some embodiments, the substrate is an injection-molded substrate. In some embodiments, the particles are sorted into a sorting outlet channel of one of the plurality of sorting junctions.

In some embodiments, a microfluidic particle sorting apparatus is provided. The apparatus comprises an injection-molded substrate comprising a first inlet and a second inlet, a network of channels, wherein the network of channels comprise a plurality of sort junctions, wherein each of the sort junctions are defined by a primary channel connected to a sorting outlet channel and a medium supply channel, an electrode channel adjacent the sorting outlet channel, an insulating film disposed above the network of channels of the substrate, and a conductive film disposed on the insulating film. In some embodiments, the injection-molded substrate comprises a cyclic olefin copolymer. In some embodiments, the insulating film comprises a cyclic olefin copolymer, wherein the injection-molded substrate and the injection-molded substrate comprise the same material. In some embodiments, the electrode channel comprises an ionic liquid. In some embodiments, the conductive film comprises a metal or a polymer. In some embodiments, the first inlet is configured to receive a sample fluid and the second inlet is configured to receive an oil. In some embodiments, the apparatus further includes a nozzle downstream from the first inlet and the second inlet to produce droplets including the particles; and an optical detection unit downstream from the nozzle, the detection unit configured to detect particles of interest by detecting scattered light or fluorescence generated from the particles when the particle is illuminated. In some embodiments, the droplets formed at the nozzle flow to the optical detection unit. In some embodiments, the electrode channel is configured to apply a force for changing a flow direction to the particles which flow in a flow path of the primary channel based on a signal from the optical detection unit.

Further aspects, objects, and advantages will become apparent upon consideration of the detailed description.

BRIEF DESCRIPTION OF THE DRAWINGS

FIGS. 1A and 1B show front and rear views of an injection-molded substrate for a microfluidic chip according to some embodiments.

DETAILED DESCRIPTION OF SPECIFIC EMBODIMENTS

Figure 1C:
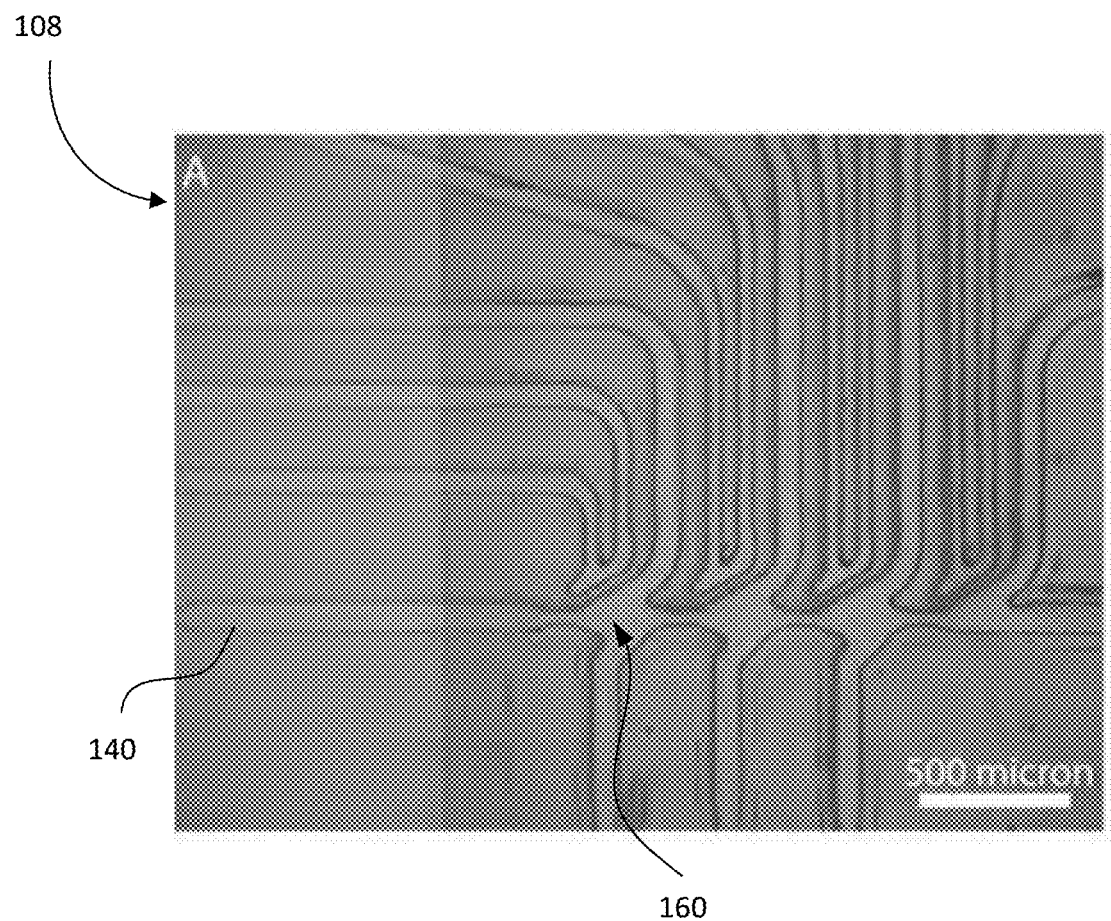
FIGS. 1C and 1D provide images of the network of channels of the injection-molded substrate of FIGS. 1A and 1B.

Examples are described herein in the context of microfluidics. Those of ordinary skill in the art will realize that the following description is illustrative only and is not intended to be in any way limiting. Reference will now be made in detail to implementations of examples as illustrated in the accompanying drawings. The same reference indicators will be used throughout the drawings and the following description to refer to the same or like items.

In the interest of clarity, not all of the routine features of the examples described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another.

The present disclosure describes a number of embodiments related to microfluidic devices, systems, and methods for analyzing and/or sorting volumes of fluid (e.g., droplets or particles) including biological materials. In some embodiments, the particles can be cells, clumps of cells, or synthetic particles (e.g., polymer beads). In some embodiments, the present disclosure relates to a microfluidic sorting apparatus that includes an injection-molded substrate to sort a volume of fluid into one of a plurality of sorting channels based on detected characteristics. More particularly, certain aspects and features of the present disclosure relate to microfluidic devices comprising an injection-molded polymer to sort a volume of a fluid containing cells, particles, or cell-like or particle-like materials (referred to herein as particles) in a primary channel, and in some embodiments, specifically to sorting outlet channel (e.g., fluorescence activated cell sorting (FACS)). The microfluidic sorting apparatus described herein is capable of identifying, tracking, and sorting particles flowing in a primary channel and controlling position, speed, and spacing between the particles.

In some embodiments, the microfluidic sorting apparatus includes an injection-molded substrate. For example, the substrate can be injection-molded from a polymer. In some cases, the substrate comprises an injection-molded cyclic olefin copolymer. The injection-molded substrate can include a network of channels including a primary channel. The primary channel can further include a medium in which the particles are carried (i.e., such that the particles flow through the primary channel in the medium). The microfluidic sorting apparatus may include an insulating film disposed over the injection-molded substrate. In some embodiments, the insulating film is a cyclic olefin polymer film that is bonded (e.g., hot pressed) to the substrate. The microfluidic sorting apparatus may include a conductive film (e.g., metal film or polymer film) deposited on the insulating film. The conductive film can serve as single ground film for each of the electrode channels in the substrate. The insulating film can separate the electrode channels within substrate from the ground film.

A sensor can be disposed adjacent to the primary channel to sense the particles. The sensor can be attached to a system for identifying, tracking, and sorting the particles. A plurality of channels can converge to form a sorting junction. For example, a sorting outlet channel can be attached to the primary channel. The sorting outlet channel is configured to receive sorted particles and medium in which they are carried. A medium supply channel can be attached to the primary channel. The medium supply channel is configured to reinject a volume of the medium received by the first channel back into the primary channel. It is noted that description embodiments described for compositions may also be incorporated in methods and/or systems and vice versa.

Conventional microfluidic sorting devices sort droplets containing biological material into channels. These microfluidic sorting devices are typically made from polymeric organosilicon compounds, specifically, polydimethylsiloxane (PDMS). PDMS generally works well for limited use applications (e.g., academic studies). For example, PDMS is a good material to conduct tests for rapid prototyping of microfluidic devices. However, PDMS has limited use for microfluidic devices due to several drawbacks and poor manufacturability. Specifically, it is difficult to integrate electrodes in PDMS substrates or to carry out deposition directly on the surface of PDMS due to poor bonding characteristics. Additionally, PDMS is known to absorb organic solvents and small molecules due to its porosity, causes water to evaporate, and has an innate hydrophobicity.

The microfluidic devices and methods described herein provide significant advantages over conventional PDMS substrates. In some embodiments, the microfluidic device may comprise an injection-molded substrate. For example, the substrate of the microfluidic device can be an injection-molded cyclic olefin copolymer. The devices and methods described herein combine droplet making and sorting in a scalable manufacturing process with injection molded plastics. In some embodiments, the microfluidic devices described herein include a unique electrode design that effectively sorts particles, which was not possible with PDMS substrates. For example, the microfluidic devices described herein include an electrode channel adjacent a sorting outlet channel and a conductive ground film. Unlike a PDMS substrate, the microfluidic devices described herein can utilize a single conductive film layer as ground film for each of electrode channels including an ionic liquid. Additionally, the microfluidic devices described herein include a modular, multi-sorting fluidic design with features for keeping inter-droplet distances constant and provide efficient timing parameters calculated from fluorescence or scatter signal triggers to precisely actuate a plurality of sorting electrodes. The microfluidic devices described herein can be produced from inexpensive manufacturing processes that allow standardization, reproducibility, and high volume production. Therefore, the microfluidic devices described herein can be manufactured at low cost and in large volumes using easily available industrial machinery. Moreover, due to ease of manufacturing, the microfluidic devices described herein can be standardized and uniform (e.g., with respect to dimensions, surface properties, repeatability).

As described above, the microfluidic devices described herein include an injection-molded substrate comprising a network of channels. The network of channels may include a primary channel comprising a plurality of sort junctions. The sort junctions can be defined by a region including the sorting channel, an electrode channel, and a medium channel. The microfluidic devices include an insulating film disposed above an injection-molded substrate. The insulating film can serve as a cover for the substrate. The insulating film can be formed by dissolving a polymer in a solvent. For example, a cyclic olefin copolymer can be dissolved in a solvent (e.g., sec-butylbenzene or cyclohexane). The dissolved cyclic olefin copolymer can be spun (e.g., electrospinning) onto a glass substrate. The insulting film can be peeled from the substrate and applied to the substrate. In some embodiments, the insulating film is hot pressed onto the substrate to adhere the injection molded substrate and the insulating film. A conductive film can be deposited on the insulating film to serve as the ground film.

The microfluidic device is continuous flow device that continually sorts droplets into sort channels. The design of the microfluidic device includes an electrode channel adjacent each of the sorting channels. The conductive film (e.g., metal film or polymer film) can serve as a single ground film for all of the electrode channels. Each of the medium channels at the sort junctions can provide additional medium to the primary channel to maintain the flowrate and droplet distance as particles are sorted in sorting channels. The electrode channels may include an ionic liquid electrode, such that a pulse can be applied to force a particle into a sorting channel. The insulating film can be disposed between an ionic liquid electrode and the substrate, thereby separating the ionic liquid electrode and the conductive film. In some embodiments, the conductive film is a metal film (e.g., a gold film) or a polymer film. The conductive film can be as close as possible to the ionic liquid electrodes, but is separated by the insulting film. The combination of the design of the microfluidic device including the conductive film (e.g., single ground film), ionic liquid electrode at each sorting junction, medium supply channel at each sorting junction, and the insulating film allows for injection-molded substrates to effectively sort particles.

In some embodiments, the present disclosure provides a system for sorting particles. The system may include a network of channels comprising a primary channel having a plurality of particles dispersed in a medium. The particles move from a first end of the primary channel to a second end of the primary channel. The system includes an optical detection sensor to detect each of the plurality of particles. The optical detection sensor may be positioned adjacent to the primary channel. The network of channels includes a plurality of sorting junctions configured to sort sensed particles. In some embodiments, the sorting junction can be the intersection of a sorting channel, electrode channel, and medium supply channel at the primary channel. The sorting junction is configured to receive the sorted particles in sorting channels and to simultaneously maintain the volume of the medium in the primary channel via the medium channel.

FIGS. 1A and 1B show front and rear views of a microfluidic chip, respectively, according to some embodiments described herein. The microfluidic chip 100 may comprise a substrate 105 including a network of channels. The substrate 105 can be an injection molded article. The substrate may be injection molded from a polymer. For example, the substrate 105 may comprise a cyclic olefin copolymer. In some embodiments, the substrate may be produced by depositing a cyclic olefin copolymer on a mold (e.g., a precision mold). The cyclic olefin copolymer can be cured on the mold to form the substrate. The formed substrate can be removed from the mold. In some embodiments, the microfluidic chip 100 is positioned in or on a substrate 105.

In some cases, the substrate 105 can be a polymer substrate. For example, the polymer substrate can be a poly(methyl methacrylate) (PMMA) substrate, a cyclic olefin copolymer (COC) substrate, a cyclo-olefin polymer (COP) substrate, a polycarbonate (PC) substrate, or a polystyrene (PS) substrate, or any suitable substrate for injection molding. As described herein, injection-molded substrates for a microfluidic chip may include different structures for particle sorting compared to conventional PDMS substrates. For example, an injection-molded substrate may include an insulating film (not shown) to cover the channels of the substrate 105. A conductive film 106 (e.g., a ground film) can be deposited on the insulting layer. As shown in FIGS. 1A and 1B, a conductive film 106 can be deposited on a portion of the substrate 105. For example, the conductive film 106 can deposited in a region of the substrate 105 including electrode channels. In the embodiment shown in FIGS. 1A and 1B, the conductive film 106 is deposited on half of the substrate 105.

In some embodiments, the substrate 105 can have additional surface layers, for example, electrodes, coatings, surface functionalizations, or the like. In some examples, particles or droplets including particles can be sorted within the substrate. For example, the microfluidic chip 100 can be created by creating a channel or passage or a network of channels or passages in the substrate 105. Optionally the passages are created by aligning a first substrate with a channel or network of channels and a second substrate with corresponding channels or networks of channels (e.g., a mirrored channel or network of channels) and aligning and joining the first substrate to the second substrate such that the channels within the first and second substrates align to form passages through the joined substrates.

Figure 1D:
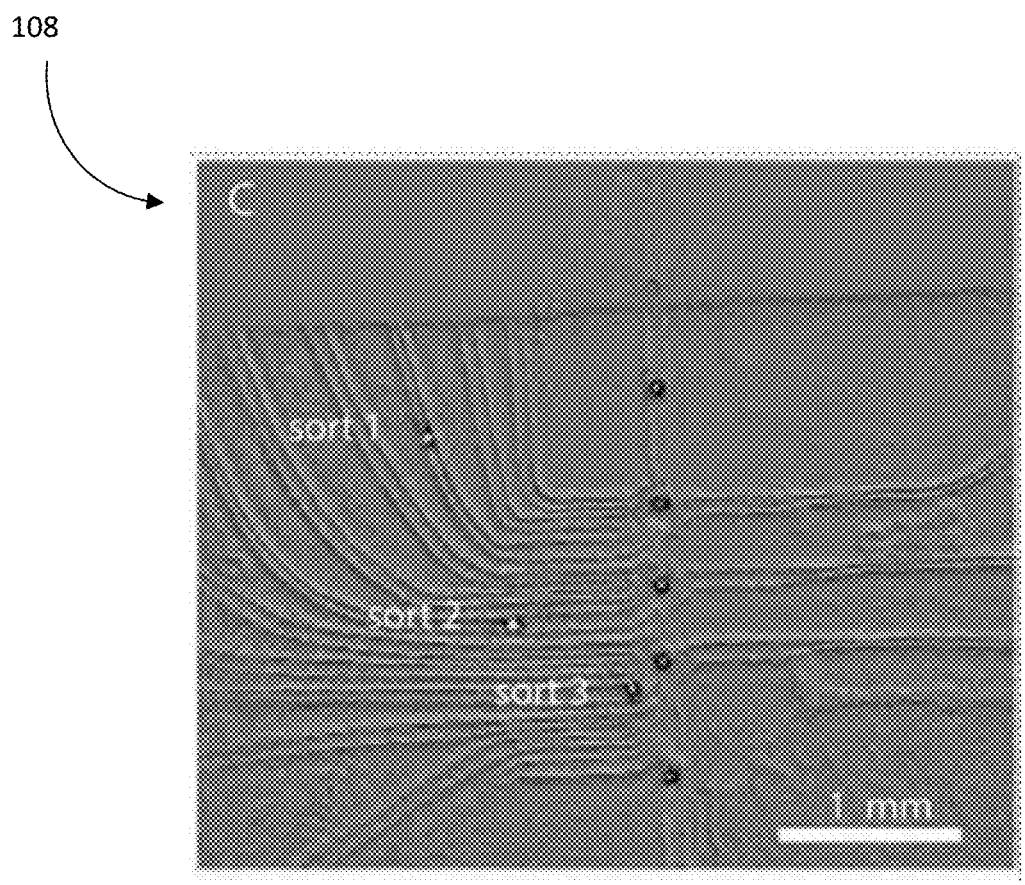

As shown in FIGS. 1C and 1D, the substrate 105 may include a network of channels 108. The network of channels includes a primary channel 140 to move particles from a first end to a second end of the microfluidic device. In the embodiment shown in FIG. 1C, the substrate includes four sort junctions 160 for sorting the particles as they move along the primary channel. Due to the resolution limitations of injection molding, the channels of the substrate are spaced apart and dimensioned for ideal microfluidic characters (e.g., uniform movement of particles). Additionally, corners of the channels are rounded rather than sharp. The molds for producing the injection molded substrate may be produced from high precision machining to make the masters molds.

Figure 6:
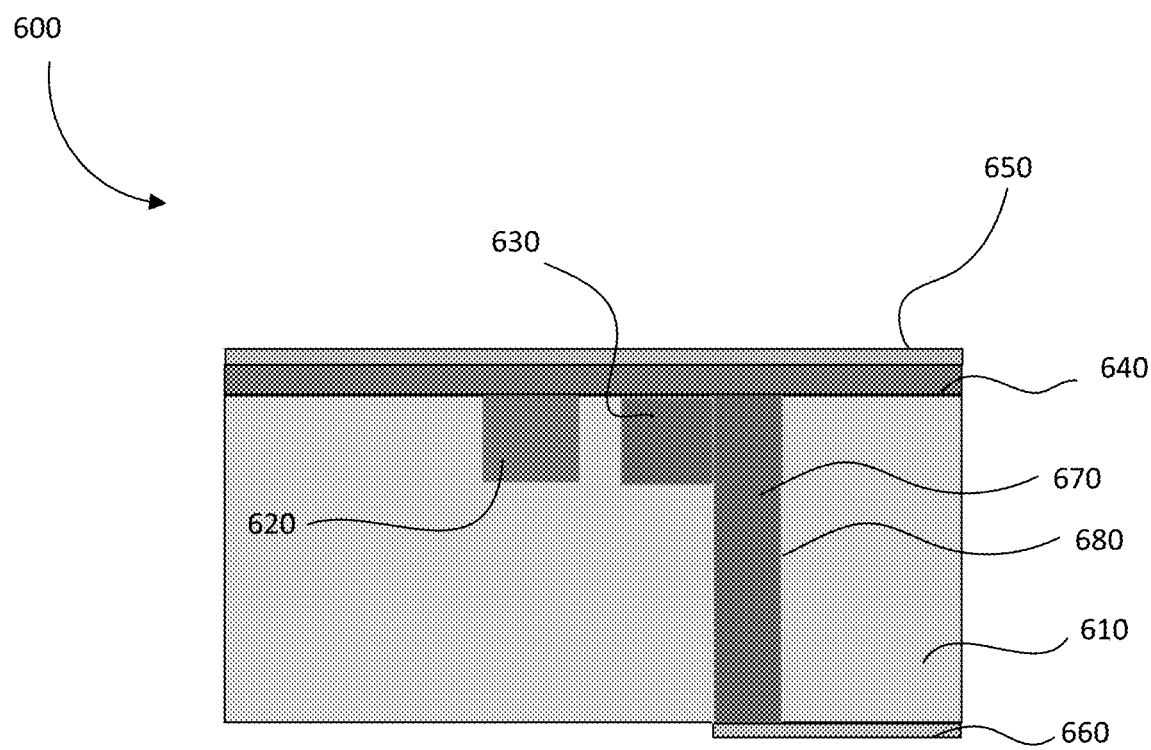
FIG. 6 illustrates a cross-sectional view of a microfluidic chip according to some embodiments.

FIG. 6 illustrates a cross-sectional view of a microfluidic chip at a sort junction according to some embodiments. The microfluidic device 600 comprises a substrate 610. As discussed herein, the substrate 610 may be an injection molded article produced from a polymer. In some embodiments, the polymer is a cyclic olefin copolymer. The cyclic olefin copolymer can be deposited on a precision mold to form the substrate 610. In some embodiments, cyclic olefin copolymers are a preferred material for the substrate due to its optical transparency, low auto-fluorescence, and inertness.

The substrate 610 includes first channel 620 adjacent to a second channel 630. In some embodiments, the first channel 620 is a sort channel configured to receive sorted particles. For example, the first channel 620 is configured to receive a droplet containing particles. The second channel 630 is an electrode channel configured to receive an electrode. For example, the second channel 630 may include an ionic liquid electrode. A voltage can be applied to the ionic liquid electrode to sort particles into the first channel 620 using dielectrophoresis. The first channel 620 and the second channel 630 are separated by a distance. For example, the second channel 630 can be spaced from about 10 micron to 100 micron (e.g., 30 to 50 micron) away from the first channel 620. In some embodiments, first channel 620 and the second channel 630 are the same height.

The substrate 610 may include an insulating film 640. The insulating film 640 can be disposed over the substrate 610. The insulating film 640 is configured to serve as a cover over the network of channels in the substrate 610. The insulating film 640 may comprise any transparent plastic film. In some embodiments, the insulating film 640 is a transparent plastic film. The insulating film 640 can be bonded or attached to the substrate 610. For example, the insulating film 640 can be physically attached, e.g., using a clamp, to the substrate 610. In some cases, the insulating film may comprise a silicon substrate, a polymer (e.g., a poly(dimethylsiloxane) (PDMS) substrate, a poly(methyl methacrylate) (PMMA) substrate, a cyclic olefin copolymer (COC) substrate, a cyclo-olefin polymer (COP) substrate, a polycarbonate (PC) substrate, or a polystyrene (PS) substrate), a gallium arsenide wafer substrate, a glass substrate, a ceramic substrate (e.g., a yttrium stabilized zirconia (YSZ) substrate), or any suitable substrate. In some embodiments, the insulating film 640 may comprise a cyclic olefin copolymer. In some embodiments, the insulating film may comprise a transparent plastic. For example, the transparent plastic may include polycarbonate, PMMA, acrylic, polyethylene terephthalate, amorphous polyester, PVC, polyethylene, silicone, or polypropylene.

In some embodiments, the insulating film 640 is the same material as the substrate 610. For example, the substrate 610 and the insulating film 640 may both comprise a cyclic olefin copolymer. The cyclic olefin copolymer of the insulating film 640 may be a different grade than the cyclic olefin copolymer of the substrate 610. In some embodiments, the insulating film 640 comprises a cyclic olefin copolymer having a lower glass transition temperature than the material of the substrate 610. In this way, the insulating film 640 can be heated and applied to the substrate 610 to bond the insulating film 640 to the substrate 610 (e.g., hot-pressing the insulating film to the substrate).

The microfluidic device 600 may include a thin film 650 disposed on the insulating film 640. In some embodiments, the thin film 650 comprises a metal. The thin film 650 may comprise any conductive metal. In some embodiments, the thin film may comprises one of gold, indium tin oxide, or silver nanowires. The thin film 650 may function as a ground film. The thin film 650 can deposited over the insulating film 640 to form the ground film. The thin film 650 can be deposited in a region of the substrate 610 including the second channel 630 including the electrode to serve as the ground plane. The second channel 630 may comprise an ionic liquid electrode that is separated from the thin film 650. In some embodiments, the thin film 650 is separated from the second channel 630 containing the electrode by the insulating film 640. In this embodiment, the thickness of the insulating film 640 defines the distance of the thin film 650 from the second channel 630. For example, the insulating film may have thickness from 5 to 100 microns (e.g., from 20 to 50 microns).

In conventional microfluidic sorting devices, sorting has been done by creating an electrode channel and ground channel close to the fluidic channel. Both the electrode channel and ground channel are filled with low-melt solder, silver paste, or salt water. However, the use of low-melt solder/silver paste is inconvenient because of the difficulties in handling the material. Additionally, salt water can evaporate leaving behind salt crystals. Advantageously, the microfluidic devices described herein utilizes an ionic liquid electrode (e.g., a type of liquid salt). In some embodiments, the ionic liquid is 1-ethyl-3-methylimidazolium tetrafluoroborate; however, any type of ionic liquid is contemplated. Ionic liquids do not evaporate and can be used as electrodes for a long time (e.g., months). Additionally, ionic liquids flow through the channel making them easy to fill and remove. It should be noted that the electrode design will work with low-melt solder, silver paste, gallium, or salt water without much change; however, the use of ionic liquid has the above-mentioned advantages. Due to the single thin film, the forces are directed in the plane of the chip, which towards the electrode. This allows for a lower voltage to sort the particles compared to a conventional two electrode channel configuration.

The combination of the ionic liquid electrode and the thin film serving as the ground film significantly simplifies the connections required for microfluidic sorting devices and makes for compact designs, particularly for devices including a plurality of sort junctions. The thin film also neutralizes stray charges and serves as a mirror allowing for observation of droplets when illuminated using an infra-red LED (infra-red does not interfere with fluorescence measurements). In some embodiments, the thin film covers only the region of the microfluidic sorting device including electrode channels and not the optical detection region, as optical transparency is needed for laser probing.

In some embodiments, the substrate 610 does not include a channel for a ground electrode. For example, the present microfluidic device replaces ground electrode channels for each sorting outlet channel with a thin film (e.g., a gold film) as a common ground plane for all the ionic liquid electrodes. In microfluidic sorting devices with a plurality of sorting channels, the thin film m can serve as a common ground plane for each of the electrode channels.

In some embodiments, the substrate 610 includes a conductive traces 660. The conductive traces 660 can be in contact with the second channel 630 or a port channel 670. The port channel 670 may be in communication with the second channel 630. In some embodiments, the port channel 670 can supply the ionic liquid electrode to the second channel 630. The conductive traces 660 may be disposed on the opposite side of the substrate 610 from the thin film 650. The conductive traces 660 may comprise a conductive material. For example, the conductive traces 660 may comprise gold or another metal. The conductive traces 660 can lead from the port channel 670 to the edge of the microfluidic chip 600 to connect to an electrical source. In some embodiments, the inner walls of the port channel 670 may include a conductive material 680. For example, the inner walls of the port channel 670 may include a gold film. The gold film on the inner walls of the port channel 670 is configured to provide an electrical connection to the ionic liquid electrode.

Figure 2A:
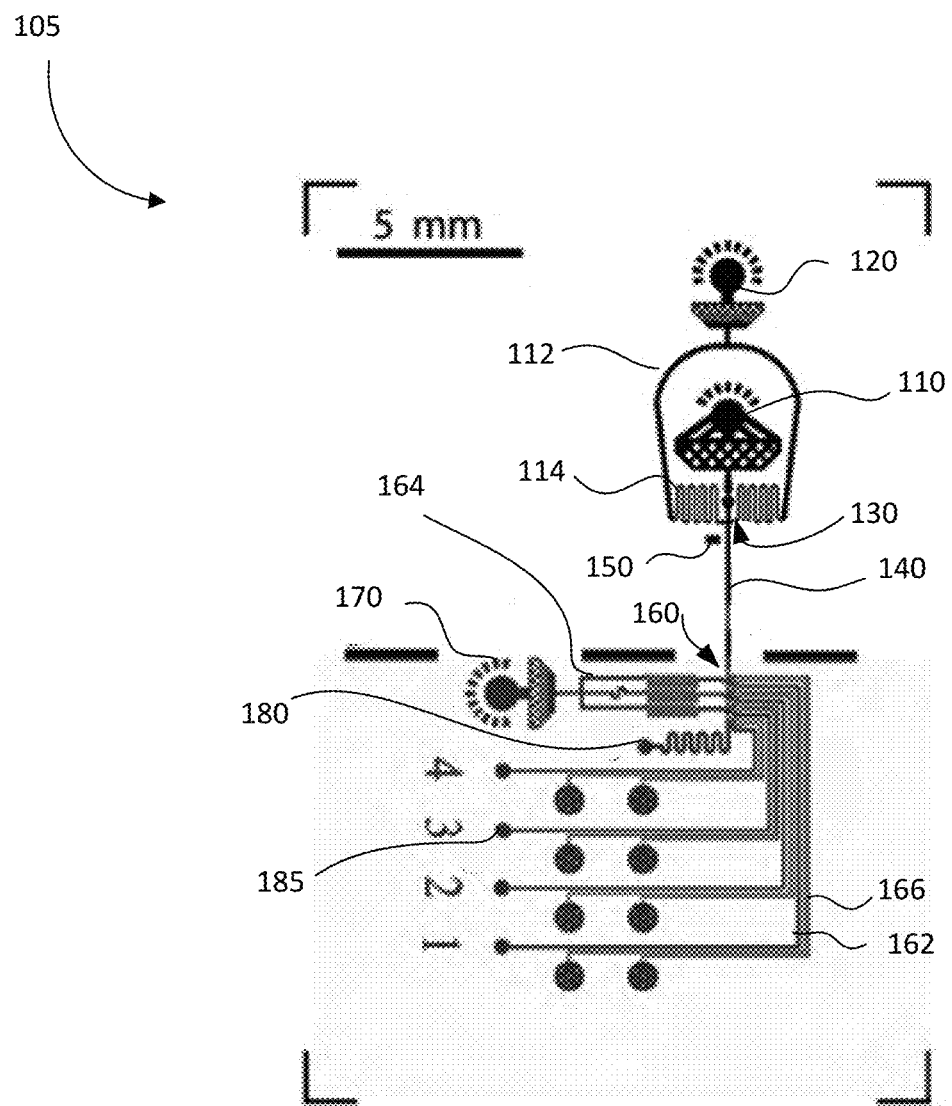
FIGS. 2A and 2B are illustrations of micrographs showing droplets flowing in a channel according to an embodiment described herein.

FIG. 2A is an illustration of a micrograph of the microfluidic chip 100 of FIG. 1. The microfluidic chip 100 includes a first inlet 110 for receiving a fluid sample. The fluid sample may include a biological sample comprising a plurality of particles. For example, fluid sample may comprise particles including, for example, cells, proteins, enzymes, viruses, cell fragments, etc. In some embodiments, the fluid sample is dispersed in water. The first inlet 110 may feed the fluid sample directly into a primary channel 140. The primary channel 140 is configured to move the fluid sample from a first end of the primary channel 140 to a second end of the primary channel. The particles in the fluid sample can sorted into one of a plurality of sorting junctions based on the detected characteristics of the particles in the fluid sample.

The microfluidic chip 100 may include a second inlet 120. The second inlet 120 is configured to receive a medium. The medium can be immiscible liquid. For example, the medium can be immiscible with the fluid sample. In some embodiments, the medium can be oil. The oil can be a fluorinated oil. The second inlet 120 may be coupled to a channel 112 that feeds the medium to a flow focusing region 130. The channel 112 may comprise a region 114 having a serpentine geometry to control the flow of the medium to the primary channel 140. The geometry of the channel 112 can provide a desired flow rate for the medium.

The channels for the medium and the fluid sample may intersect in the flow focusing region 130 before flowing through the primary channel 140. The fluid sample and the medium (e.g., immiscible solvent) are supplied to the flow focusing region 130 to produce droplets via the nozzle. The flow focusing region 130 comprises a nozzle (not shown) to produce droplets that include particles of the fluid sample. The droplets can be suspended in the medium (e.g., oil) as the droplets flow through the primary channel 140. In some embodiments, at the flow focusing region 130, an inert fluorinated oil stream and the fluid sample stream meet at the nozzle to produce droplets. In this way, the plurality of droplets containing particles to be detected or sorted are suspended in the medium.

The flow rate of the medium and fluid sample are selected to keep flow in the dripping regime to produce uniform droplets. For example, the flow rate for the fluid sample may range from 0.5 µl/min to 10 µl/min, e.g., from 1 µl/min to 8 µl/min, from 2 µl/min to 7 µl/min, from 3 µl/min to 6 µl/min, or from 4 µl/min to 6 µl/min. The flow rate for the medium may range from 20 µl/min to 100 µl/min, e.g., from 25 µl/min to 90 µl/min, from 30 µl/min to 80 µl/min, from 35 µl/min to 75 µl/min, or from 40 µl/min to 60 µl/min. The flow rates of the fluid sample and the medium can be controlled by a pump. For example, the pump can be a syringe pump. The droplets can be produced at a droplet production rate. The droplet production rate can range from 100 hz to 5 khz. At higher droplet production rates, the droplets experience shearing resulting in non-uniform droplet size. In some embodiments, the droplet diameter varies from 40 to 70 micron, depending on the nozzle geometry and flow rates.

The microfluidic chip 100 includes an optical detection region 150. The optical detection region 150 can be downstream from the flow focusing region 130. The droplets suspended in the medium flow through the primary channel 140 to the optical detection region 150. The diameter of the primary channel 140 may narrow at the at the optical detection region. In some embodiments, the optical detection region 150 includes a narrow channel for the droplets for flow-controlled particle movement. The primary channel 140 may have a height and width that provides an ideal flow of particles for optical probing. In some embodiments, the height of the primary channel 140 at the optical detection region may range from 10 microns to 50 microns, e.g., from 15 microns to 45 microns, from 20 microns to 40 microns, from 25 microns to 50 microns, or from 30 microns to 40 microns. In some embodiments, the diameter of the primary channel 140 at the optical detection region may range from 30 microns to 200 microns, e.g., from 30 microns to 180 microns, from 35 microns to 160 microns, from 40 microns to 140 microns, from 45 microns to 100 microns, or from 50 microns to 80 microns.

The primary channel 140 may have a smaller diameter at the optical detection region. For example, the optical detection region may have a smaller diameter than the largest diameter of the primary channel 140. The diameter of the primary channel 140 at the optical detection region may be less than 80% of the diameter of the primary channel 140, e.g., less than 70%, less than 60%, less than 50%, less than 40%, or less than 30%. In some embodiments, the channel height is 30 micron, the channel width is 100 micron, and the channel width narrows from 100 micron to 50 micron in the optical detection region. The height and width were chosen as a compromise between the fluidics and optics requirements. For optical detection, it is preferable to have droplet confinement within the focused laser power region, while for fluidics, channel dimensions smaller than droplet diameter can cause droplet shearing and breakup.

Figure 2B:
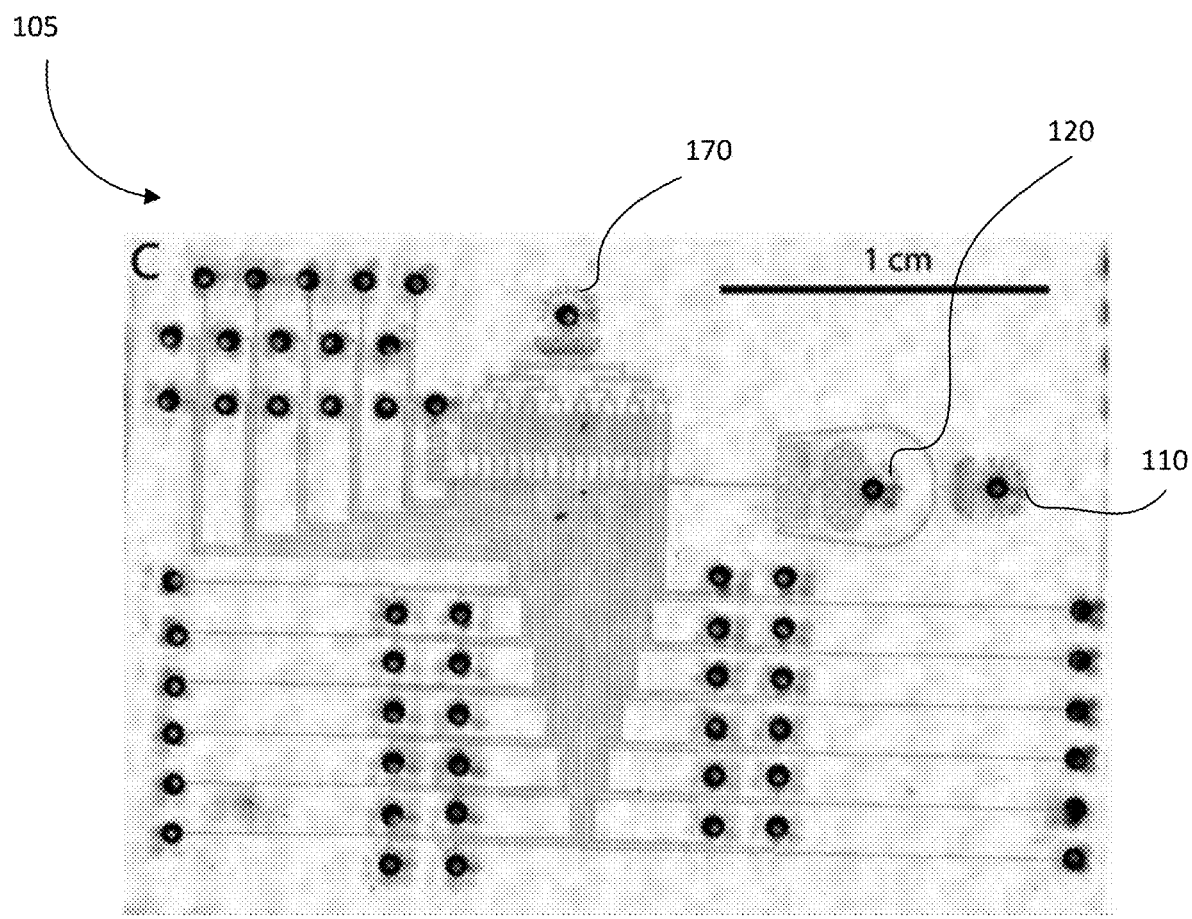

The microfluidic chip 100 may include a sort junction 160 downstream from the optical detection region 150. In the embodiment of the microfluidic chip 100 shown in FIG. 2A, the primary channel 140 may include four sorting junctions 160. However, the microfluidic chip 100 may include a plurality of sorting junctions. For example, FIG. 2B shows an embodiment of the substrate 105 include 17 sort junctions. Each sorting junction 160 may include a sorting outlet channel 162 connected to the primary channel 140 and a medium supply channel 164 connected to the primary channel 140. In some embodiments, oil can be supplied from medium supply channel inlet 170 to the medium supply channel 164. An electrode channel 166 may be adjacent the sorting outlet channel 162. In some embodiments, droplets or particles sorted into a sorting outlet channel 162 from the sort junction 160 are collected in collection chamber 185. The sorting junctions are further described in FIGS. 3A and 3B. The microfluidic chip 100 includes a primary channel waste chamber 180. Droplets that are not sorted into one of the sort junctions 160 can be supplied to the primary channel waste chamber 180.

Figure 3A:
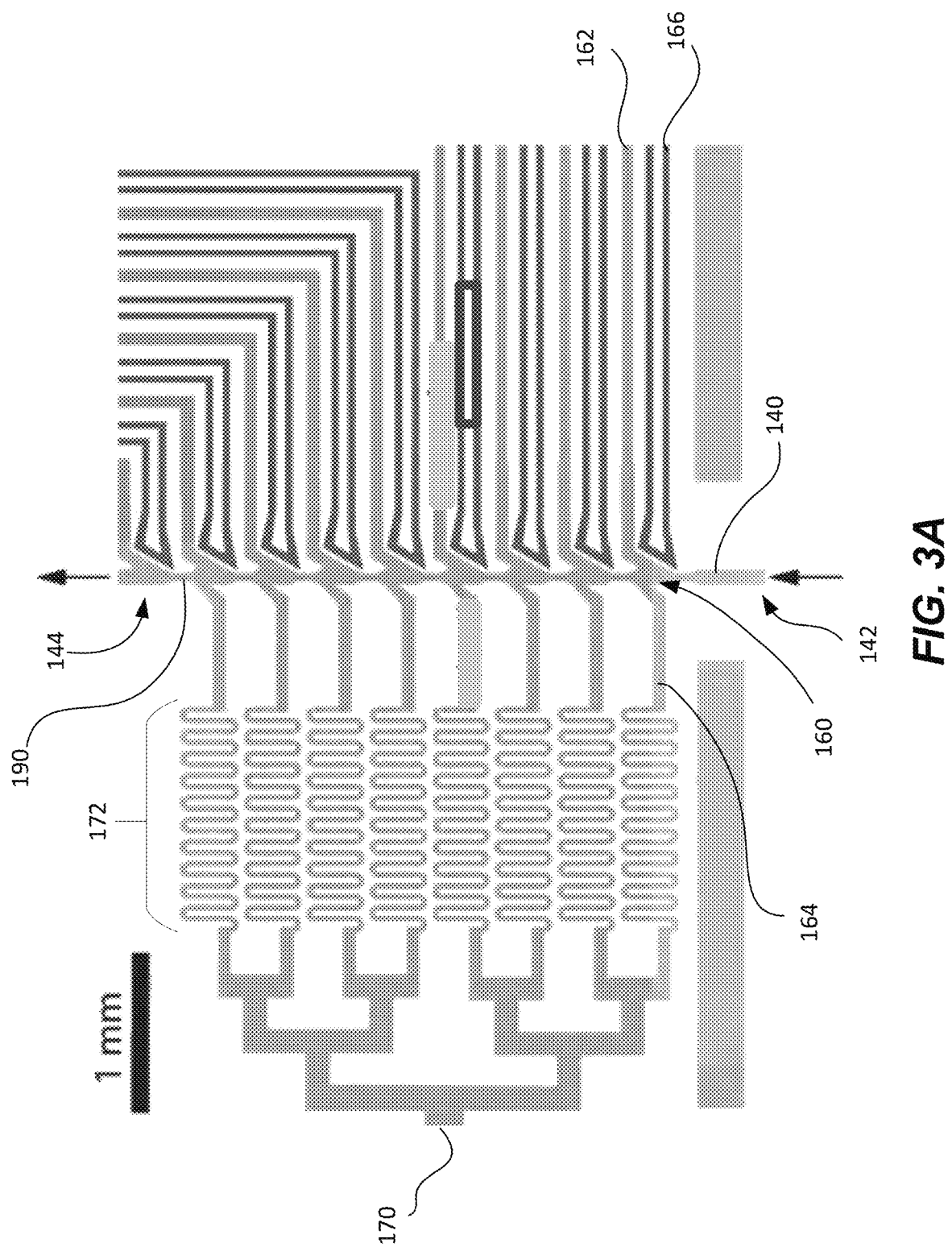
FIG. 3A-3C are illustrations of a network of channels including a plurality of sort junctions of a microfluidic device according to an embodiment described herein.
Figure 3B:
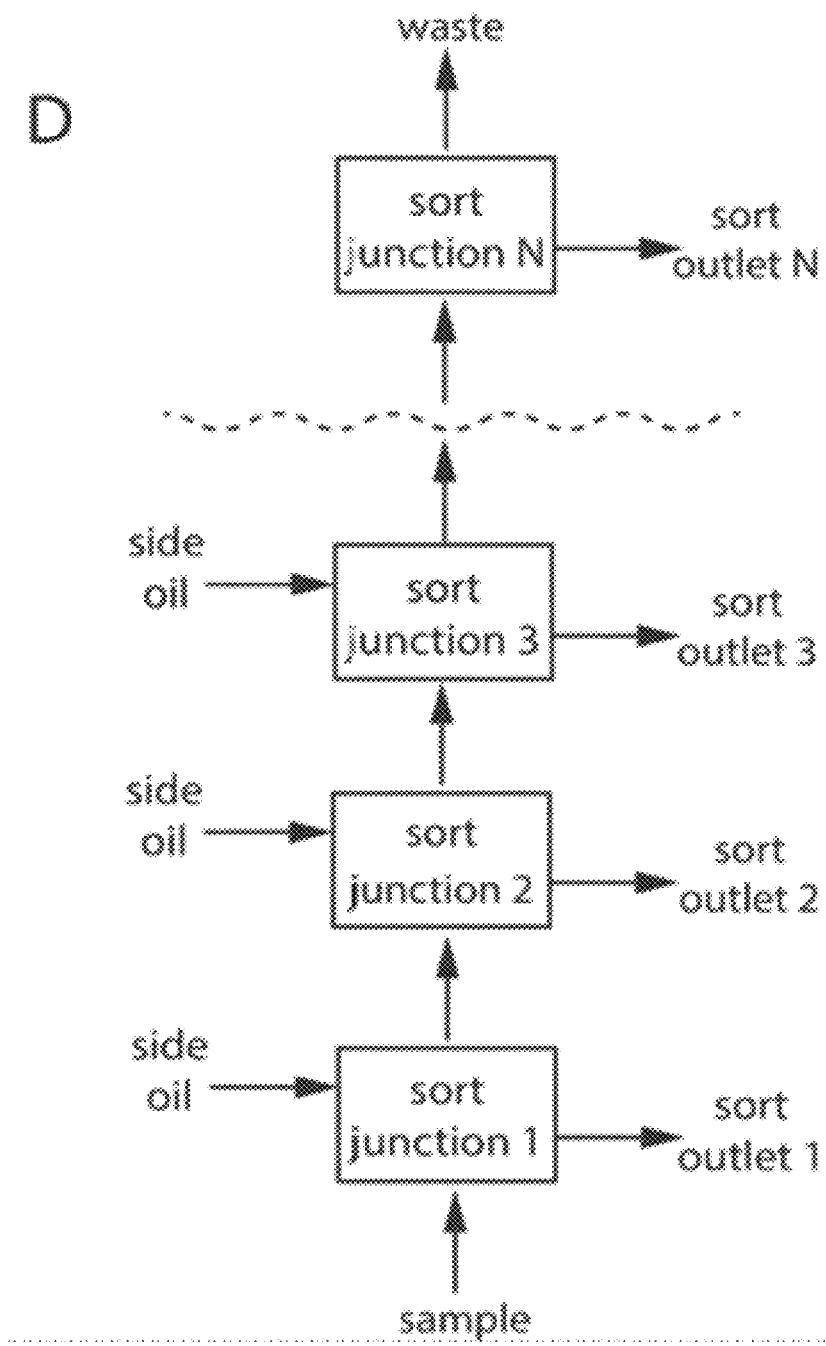

FIGS. 3A and 3B provide a schematic of a sorting region of the microfluidic chip 100 according to some embodiments. After optical detection, the droplets flow through the primary channel 140 into the sorting region of the microfluidic chip 100. The microfluidic chip 100 includes a primary channel 140 such that a particle or the droplet moves from a first end 142 of the primary channel to a second end 144 of the primary channel. The particle or droplet may be dispersed in a medium. For example, the medium can be oil. The particle or droplet may sorted into one of the plurality of sorting outlet channels 162 from the primary channel 140.

The microfluidic chip 100 may include a plurality of sorting junctions 160. In some embodiments, the primary channel 140 includes a constriction region 190 before each sort junction 160. The constriction region is configured to center the flow of the droplets. In some embodiments, the constriction region 190 causes the droplets to move faster and separates the droplets from adjacent droplets, thereby making the droplets easier to sort.

Each sorting junction 160 may include a sorting outlet channel 162 connected to the primary channel 140 and a medium supply channel 164 connected to the primary channel 140. For example, the sorting junction 160 can include the convergence of the sorting outlet channel 162 and the medium supply channel 164 at the primary channel 140. The sorting outlet channel 162 may serve as a channel for each of the droplets to receive sorted particles and medium in which they are carried. The sorting outlet channel 162 may be adjacent an electrode channel 166. The electrode channel 166 may include an electrode that exerts a force on the droplets to pull the droplets into the first channel. For example, the electrode channel 166 includes an ionic liquid electrode that can receive a voltage to force droplets into the sorting outlet channel 162 using dielectrophoresis. As shown in FIG. 3B, optionally the plurality of particles are selectively sorted at a first sorting junction, a second sorting junction, a third sorting junction, etc. such that a first particle type is sorted at the first sorting junction, a second type of particles is sorted at a second sorting junction, and a third type of particle is sorted at a third sorting junction, and the like.

The medium supply channel 164 is configured to reinject a volume of the medium received by the sorting outlet channel 162 back into the primary channel 140 from a medium supply channel inlet 170. In some embodiments, the medium supply channel 164 comprises a network of channels connected to a medium supply channel inlet 170. The network of channels for the medium may include a serpentine region 172 to control flow of the medium into the primary channel 140. The medium supply channel 164 is designed to makeup an amount of medium (e.g., oil) that is lost from the primary channel 140 to the sort outlet channel 162. The serpentine region 172 provides a high resistance channel such that a controlled amount of medium is provided to the primary channel 140. In some embodiments, a pump supplies the medium to the medium supply channel 164. The serpentine arrangement provides a much longer channel for high resistance. Additionally, the serpentine channel can be narrower than the channels in the channel network to provide additional resistance.

In some embodiments, the sorting outlet channel 162 and the medium supply channel 164 creating the sorting junction 160 can be positioned relative to each other in any suitable geometry. For example, the medium supply channel 164 can be positioned downstream of the sorting outlet channel 162. In some cases, the medium supply channel 164 can be positioned upstream of the sorting outlet channel 162. In some cases, the sorting outlet channel 162 and the medium supply channel 164 can be positioned on opposite sides of the primary channel 140. In some cases, the sorting outlet channel 162 and the medium supply channel 164 can be positioned on the same side of the primary channel 140. When the microfluidic chip 100 is in a three-dimensional configuration, the sorting outlet channel 162 and the medium supply channel 164 can be positioned angularly about a linear axis of the primary channel 140 (e.g., the primary channel 140 and the sorting outlet channel 162 can be in a first plane and the medium supply channel 164 can connect to the primary channel 140 at any suitable angle to that plane). Thus, the sorting junction can have any suitable geometry.

To design the sorting region, the fluidic network can be modelled like an electric circuit downstream of the nozzle when assuming laminar flow conditions. In this embodiment, the network of channels for the medium has high fluidic resistance to model an ideal "current" source. The medium supply channel compensates for the loss of medium when droplets are pulled into the sorting channel, while minimizing any perturbation to flow conditions in the primary channel. The serpentine channels are used to increase the fluidic resistance. Each medium supply channel resupplies oil lost in the preceding sort channel, thus keeping the volumetric flow rate in the primary channel constant, which in turn keeps inter-droplet distances constant.

Figure 3C:
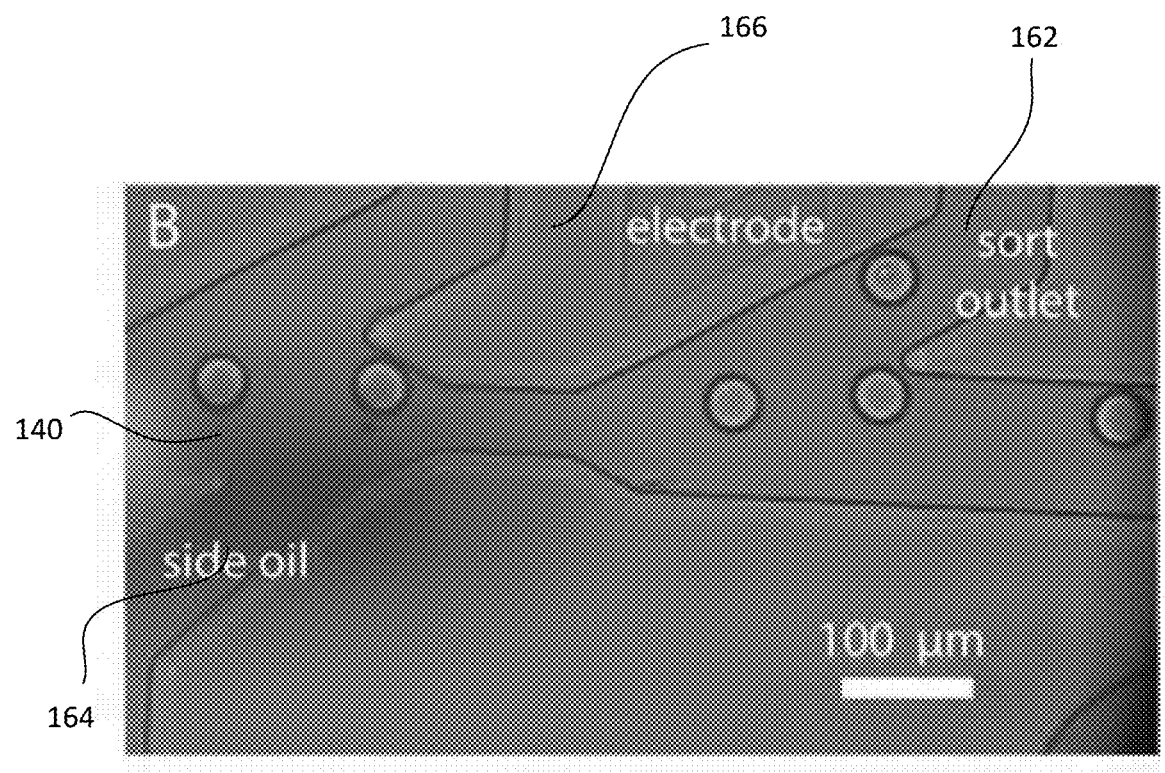

FIG. 3C shows an example of a droplet sorted into the sorting outlet channel 162. The droplets in the medium can be sorted into the sorting outlet channel 162 using dieletrophoresis. For example, the electrode channel 166 associated with the sorting outlet channel 162 can be activated to pull the droplet into the sorting outlet channel 162. For example, the electrode channel 166 may include an ionic liquid electrode that receives an electrical pulse to pull the droplets into the sorting outlet channel 162. Once the droplets are detected, dielectrophoresis induced forces manipulate or control the velocity, including direction, of dielectric particles in multiple channels of the microfluidic devices described herein. The medium supply channel 164 compensates for the loss of medium when droplets are pulled into the sorting outlet channel 162, while minimizing any perturbation to flow conditions in the primary channel 140.

In some cases, during a sorting operation, a volume of the medium (e.g., oil) flows into the sorting outlet channel 162. As such, a total volume of the primary channel decreases, which can disrupt the flow of the particles. Thus, the volume of the medium flowing into the sorting outlet channel 162 can be replaced by reinjecting an equal volume of medium from the medium supply channel 164. In certain aspects, the volume of the medium flowing into the sorting outlet channel 162 can be replaced by reinjecting an equal volume of oil medium from a plurality of medium supply channel 164 (e.g., a pair of medium supply channels 164 can be used in concert to replace the volume of medium flowing into a single sorting outlet channel 162).

In some embodiments, as one droplet is sorted into the sorting outlet channel 162, a medium is being supplied to the primary channel 140. This is to compensate for the oil that is lost to the sorting outlet channel 162. This helps maintain the distance between the droplets. Therefore, each of the sort junctions 160 can serve as independent units. Each sort junction 160 comprises a sorting outlet channel 162 and a medium supply channel 164. As the droplets are sorted into each sorting outlet channel 162 on detected characteristics, medium is correspondingly added to the primary channel 140 from the medium supply channel 164. This maintains the flow rate in the primary channel 140 to maintain a distance between the droplets. For example, if 30% of the oil medium including the droplet of interest is sorted into a sort channel, a corresponding amount of side oil is supplied from the side oil supply channel.

In certain embodiments, the sorting includes dielectrophoretic manipulating and carrying by the medium. The dielectrophoretic manipulating optionally comprises inducing a dipole moment in the subset of particles. The dipole moment in the subset of particles forces the subset of particles into the sorting channel. Carrying by the medium comprises employing an initial volumetric flow rate of the medium flowing into the sorting channel with the subset of particles. As described herein, reinjecting the medium devoid of particles (or substantially devoid of particles) includes reinjecting a volumetric flow rate of the medium equal to the volumetric flow rate of the medium flowing into the sorting channel with the sensed subset of particles. Then each of the particles are sorted into junctions based on characteristics.

Also, as noted herein, the channel or passage or network of channels or passages of the microfluidic chip 100 may be configured in a variety of shapes. The channel or passage or network of channels or passages can have a square shape, a rectangular shape, a triangular shape, a circular shape, an elliptical shape, or any suitable shape. In certain embodiments, for example, the channel or passage network of channels or passages can have any two dimensional (2D) cross section and/or three dimensional (3D) shape. Thus, the cross section of the channel or passage or network of channels or passages can be a rectangle, square, circle, ellipse, polygon, parallelogram, triangle, any combination thereof, or any suitable shape.

Figure 4A:
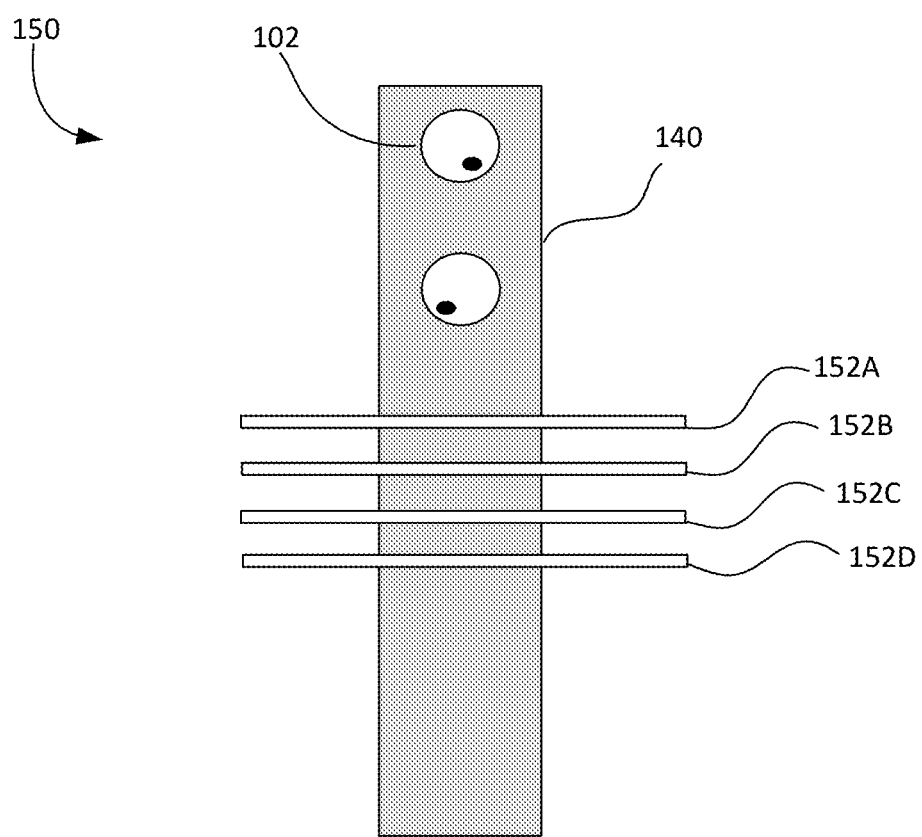
FIGS. 4A-4C illustrate an optical detection region of a primary channel including a plurality of lasers.
Figure 4B:
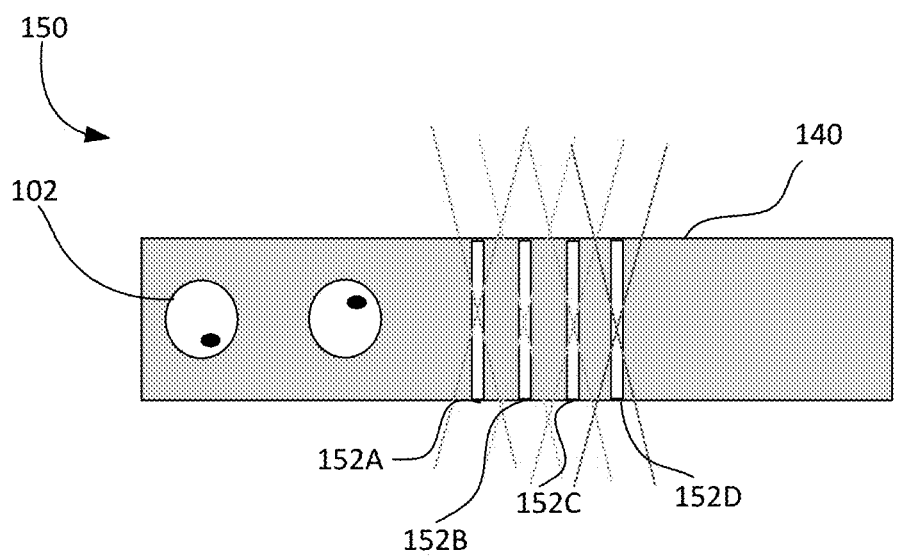

FIGS. 4A and 4B show overhead and side views, respectively, of each of the lasers 152A-D in the optical detection region 150. As shown in FIG. 4A, the droplets 102 can be provided to the optical detection region 150 to detect characteristics of the droplets for particle sorting. The optical detection region 150 may include lasers, cameras, and fluorescence/scattered light detectors that provide information on the cells flowing through the channel, along with information on the droplet position and velocity. In some embodiments, the optical detection region 150 may include a plurality of lasers 152A-D. Each of the lasers 152A-D can operate at different wavelengths. For example, the optical detection region 150 may include four lasers 152 operating at wavelengths of 405 nm, 488 nm, 532 nm, and 647 nm. The lasers 152A-D can be illuminated through a lens (e.g., Powell lens) to produce asymmetric beams in a row at the primary channel 140. For example, the lasers 152A-D can be each shaped into an asymmetric 10×200 micron beams with a Powell lens. The size of the beam along both axes can be selected to produce near-uniform illumination across the cross-section of the primary channel. The droplets that pass through the optical detection region 150 pass through the laser lines generating fluorescence and scatter signals.

Figure 5:
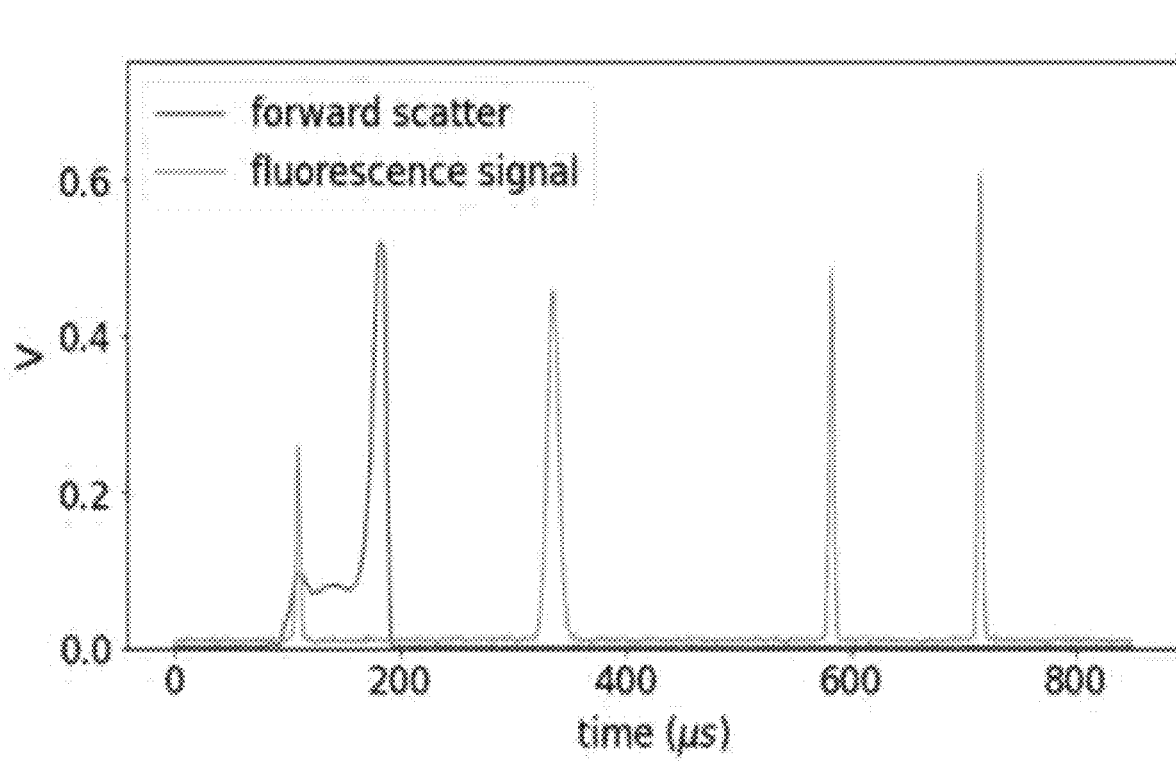
FIG. 5 is a graph of the voltage versus time signal from droplets. This trace was obtained from the forward scatter detector and a single emission detector, showing the four time-separated signals from each excitation laser. The forward scatter signal is dominated by scatter from the droplet itself and is useful in measuring flow rate, droplet size, and droplet frequency.

In some embodiments, the laser beams produced from the lasers 152A-D are shaped into a rectangular cross sectional shape for uniform illumination. The lasers 152A-D can be arranged in a row perpendicular to the primary channel and can be separated by a distance. For example, each of lasers 152A-D can be separated by about 180 microns. The fluorescence signals can be de-multiplexed by dividing the time interval into segments that represent the time a droplet spends in the vicinity of a laser. The fluorescence signals can be further corrected to compensate for spillover of dye fluorescence into multiple channels, a procedure known as compensation in flow cytometry. As shown in FIG. 5, compared to fluorescence signals, scatter signals from cells are challenging to measure because they are overwhelmed by the droplet scatter signal. However, droplet scatter signals are excellent for detecting drops and calculating timing from the laser spot to a sort junction.

In certain embodiments, a plurality of particles can be sensed by the optical detection region 150 and sorted at a high rate (i.e., processed). In some cases, the plurality of particles can be processed at a rate of from about 1 per second to about 10,000 per second (/s). For example, the particles can be processed at a rate of about 1/s, about 5/s, about 10/s, about 50/s, about 100/s, about 500/s, about 1000/s, about 1500/s, about 2000/s, about 2500/s, about 3000/s, about 3500/s, about 4000/s, about 4500/s, about 5000/s, about 5500/s, about 6000/s, about 6500/s, about 7000/s, about 7500/s, about 8000/s, about 8500/s, about 9000/s, about 9500/s, about 10,000/s, or anywhere in between.

Figure 4C:
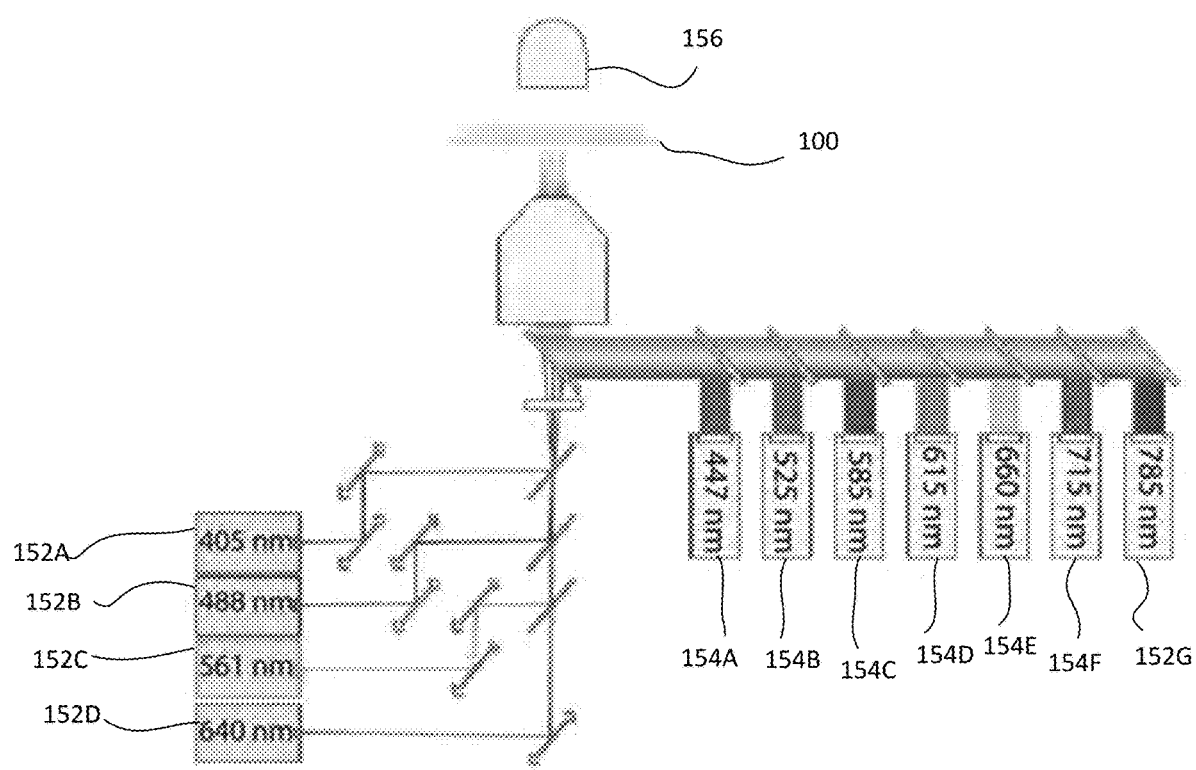

FIG. 4C shows the optical detection region 150 may include a plurality of lasers, one or more cameras, and one or more optical detectors. For example, the optical detection region 150 may include a first camera for imaging above the microfluidic chip 100 and a second camera for imaging below the microfluidic chip 100. The optical detectors can be photomultiplier tubes or photodiodes. The optical detectors can be placed behind one or more optical filters. In the embodiment shown in FIG. 4C, the optical detection region 150 includes four lasers 152A-D, seven emission detectors 154A-G, and a forward scatter detector 156. The emission channels are time-multiplexed to resolve each of the four excitation lasers on the single detector, producing a total of 21 excitation-emission channels. In some embodiments, the excitation and emission path are combined using a mirror with a small masked aperture to route the low-numerical aperture excitation beam lines to the sample, while letting the high-numerical aperture fluorescence path pass to the series of photomultiplier tube detectors.

In some embodiments, the particles (e.g., cells) may be mixed with a dye or a tag to flag specific type of particles. In some embodiments, the optical detection sensor can detect the fluorescence of the particles. The optical detection sensors can time stamp a detected fluorescence signal for each of the particles, which is processed to determine the estimated time the particles will arrive at a sort junction. The flow of the droplets through the primary channel is uniform and constant, therefore, the estimated time of arrival for each particle can be calculated by a processor. For example, the particles of interest detected by the sensors at the optical detection region can be correlated to the calculated time the particles will take to arrive at a sort junction. The electrode adjacent the sorting outlet channel can be activated to pull the cells (e.g., a pulse for a peak voltage) into a specific sort outlet. Once the droplets are detected, the electrodes provide dielectrophoresis induced forces to manipulate or control the velocity, including direction, of dielectric particles in multiple channels of the microfluidic devices described herein.

The timing for sorting involves detecting a signal from the drop as it passes through the detection region and predicting the time it takes to arrive at a sorting junction. This detection signal may be in the form of fluorescence or scatter from the drop or its contents. The time interval between a drop traversing from the laser spot to a particular sorting junction ranges from a few milliseconds to hundreds of milliseconds, depending on the distance and flow rates. To be able to sort, the flow of droplets to be uniform with low dispersion in arrival time at a sorting junction. Using videos based on cameras, the time of arrival of drops is measured at a sorting junction from a fixed starting line. The tight distribution of time of arrival (e.g., standard deviation <0.5 ms) at each sort junction implies that droplet arrival time is predictable, constant over time, and the same for every drop due to the laminar nature of flow in microchannels. Once the table of timing information is known, a single trigger measurement made upstream gives us sufficient information to be able to sort that drop into any sort outlet reliably, provided the flow rates are constant and there are no clogs or other changes to channel dimensions.

In some embodiments, the droplets are sorted into sorting channels using dielectrophoresis. For example, to pull a droplet into a sorting channel, a high voltage AC pulse can be applied to the electrode channel as a droplet just enters the sorting junction. As discussed above, the droplets are identified using, for example, temporal/spatial separation of fluorescence signals as the droplets move across laser lines. This way, fluorescence measured in a channel can be attributed to a particular laser. As shown in FIG. 5, there is some jitter in the signal, with the signal peak located anywhere within a time window of approximately 100 µs, because the bead or cell may be located anywhere in the droplet. These signals can be separated out using a time window and attribute them to the correct laser-fluorophore pair.

In some embodiments, droplets that are sorted into a sorting outlet channel can reduce the amount of medium in the primary channel, thereby increasing the main channel volumetric rate and flow velocity briefly (up to a maximum of 30%, as this is the flow percentage diverted into the sort channel). The faster the flow rate through the primary channel, the more predictable the droplet timing, presumably because faster flow implies less time for diffusive dispersion of droplet velocity. However, for any given geometry, there is a speed limit beyond which a droplet will shear into smaller droplets. In some examples, for a microfluidic device including four sorting junctions, the flow rates greater than 250 µl/min may experience droplet shearing and breakup.

Figure 10:
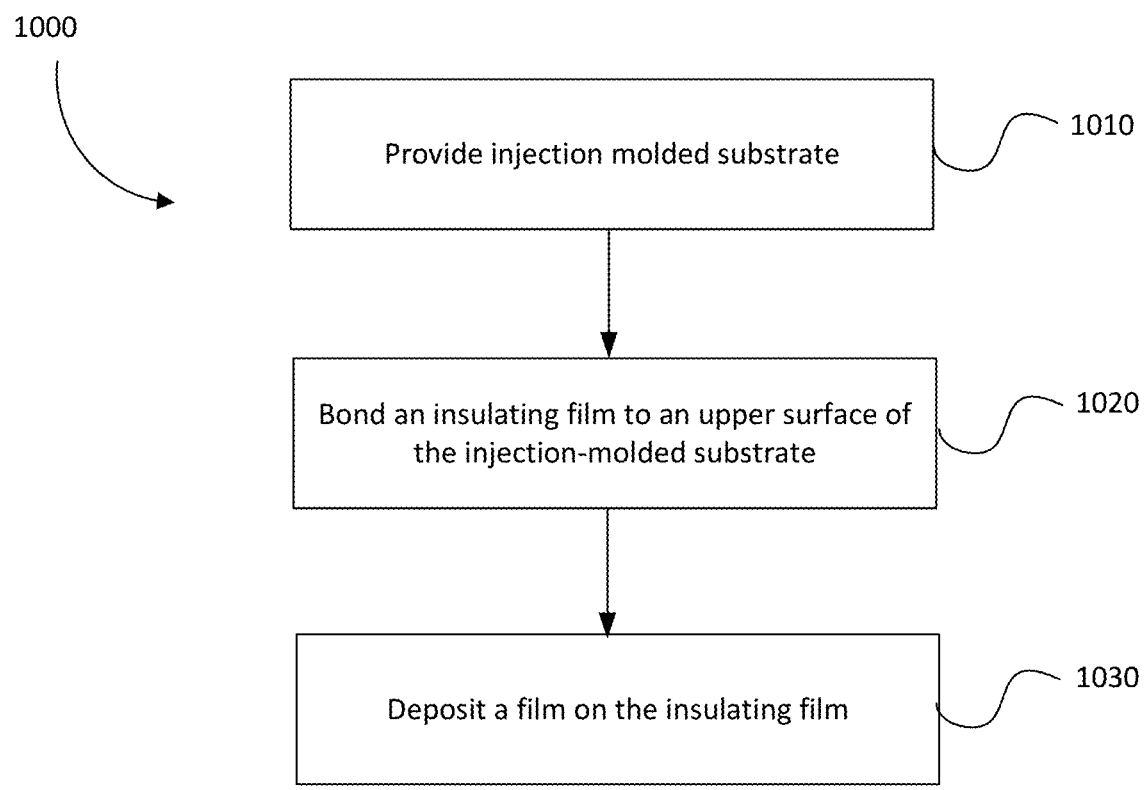
FIG. 10 provides a flow diagram of a method of producing a microfluidic chip according to some embodiments.

FIG. 10 provides a flow diagram of a method 1000 of producing a microfluidic sorting apparatus according to some embodiments. The method 1000 may include providing an injection-molded substrate comprising a network of channels 1010. In some embodiments, the substrate is an injected molded article comprising a polymer. The method may include providing a mold. The shape of the mold determines the size and shape of the microfluidic chip and the number of sort junctions. The size and shape of mold can be selected to provide a desired number of channels. In some embodiments, the mold comprises a metal mold (e.g., stainless steel mold) or a 3D printed mold. The mold can be coated with a release agent. The release agent promotes demolding after the substrate is produced on the mold.

In some embodiments, method includes depositing a cyclic olefin copolymer on the mold. The cyclic olefin copolymer can be coated or deposited on the mold. For example, the cyclic olefin copolymer can be deposited on the mold using chemical vapor deposition. The cyclic olefin copolymer may form the substrate of the microfluidic chip. In some embodiments, the mold is treated with a release agent prior to depositing the cyclic olefin copolymer.

The method 1000 includes bonding an insulating film to an upper surface of the substrate to cover the network of channels 1020. The insulating film is configured to serve as a cover. The insulating film can be produced from the same material as the substrate. For example, the substrate and the insulating film may both comprise a cyclic olefin copolymer. In some embodiments, the substrate and the insulating film may comprise a different cyclic olefin copolymer. In some embodiments, an insulating film is attached to an upper surface of the substrate to cover the network of channels by any physical means in lieu of bonding. For example, the insulating film can be clamped to an upper surface of the substrate.

In some embodiments, the insulating can be produced separately before bonding to the substrate. The process for producing the insulating film may include dissolving a polymer in a solvent. For example, a cyclic olefin copolymer can be dissolved in a solvent (e.g., sec-butylbenzene or cyclohexane). The dissolved cyclic olefin copolymer can be spun (e.g., electrospinning) onto a substrate (e.g., glass). The insulting film can be peeled from the substrate and applied to the substrate. In some embodiments, the insulating film is hot pressed onto the substrate to adhere the injection molded substrate and insulating film. In some embodiments, the method may further include baking the entire substrate to strength the bond of the injection molded substrate and insulating film.

The method 1000 includes depositing a conductive film on the insulating film 1030. In some embodiments, the conductive film can have a thickness of about 10 microns to 100 microns (e.g., about 40 microns). The insulating film is disposed above the network of channels and the conductive film is applied to the insulating film to serve as the ground electrode. The conductive film can be applied to the insulating film using election-beam physical vapor deposition.

In some embodiments, the present disclosure provides a method of sorting particles. The method includes providing a microfluidic chip. The microfluidic chip can be any microfluidic chip described herein. For example, the microfluidic chip may include an injection-molded substrate comprising a first inlet and a second inlet, a network of channels, wherein the network of channels comprise a plurality of sort junctions, wherein each of the sort junctions are defined by a primary channel connected to a sorting outlet channel and a medium channel, an electrode channel adjacent the sorting channel, an insulating film disposed above the network of channels of the substrate; and a conductive film disposed on the insulating film.

The methods includes passing a medium containing a plurality of particles through a primary channel at a selected volumetric flow rate to an optical detection sensor to sense at least a subset of the particles. The method also includes sorting the sensed subset of particles into the sorting outlet channel of one of the plurality of sorting junctions.

In some embodiments, a droplet can be dispersed in an oil medium and flowed through a primary channel. The droplet can flow past a sensor (e.g., an optical sensor). In some non-limiting examples, the sensor can be configured to sense an electric field of the particles, a magnetic field of the particles, electromagnetic radiation of the particles, interference caused by the particles, light scattering caused by the particles, any other suitable sensible attribute of the particles, or any combination thereof. The droplet can then flow into the sorting junction including a sorting outlet channel and an opposing medium channel. If the sensor indicates the droplet should be sorted, an electrode can be activated to induce a dipole moment in the droplet and to dielectrophoretically force the droplet to flow into the sorting channel.

It should be appreciated that the specific steps illustrated in FIG. 10 provide a particular method of producing a microfluidic chip according to some embodiments. Other sequences of steps may also be performed according to alternative embodiments. For example, alternative embodiments of the present invention may perform the steps outlined above in a different order. Moreover, the individual steps illustrated in FIG. 10 may include multiple sub-steps that may be performed in various sequences as appropriate to the individual step. Furthermore, additional steps may be added or removed depending on the particular applications. One of ordinary skill in the art would recognize many variations, modifications, and alternatives.

EXAMPLES

Example 1

Figure 7A:
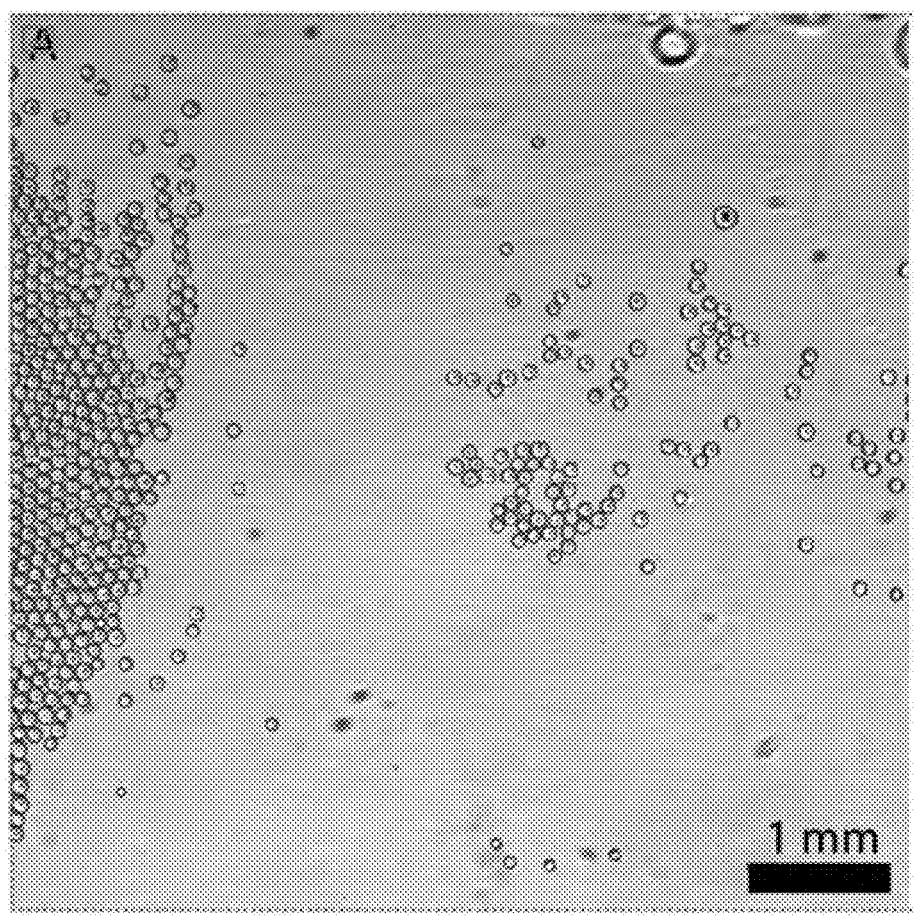
FIGS. 7A-7C provides images of sorted droplets sorted collected in a haemocytometer (A), Fluorescence (Alexa 447), pseudo color, overlaid on a brightfield image (B), and sorted droplets with Alexa 647 fluorescent beads (pseudo color), in this case collected from a 4-sort PDMS device (C).
Figure 7B:
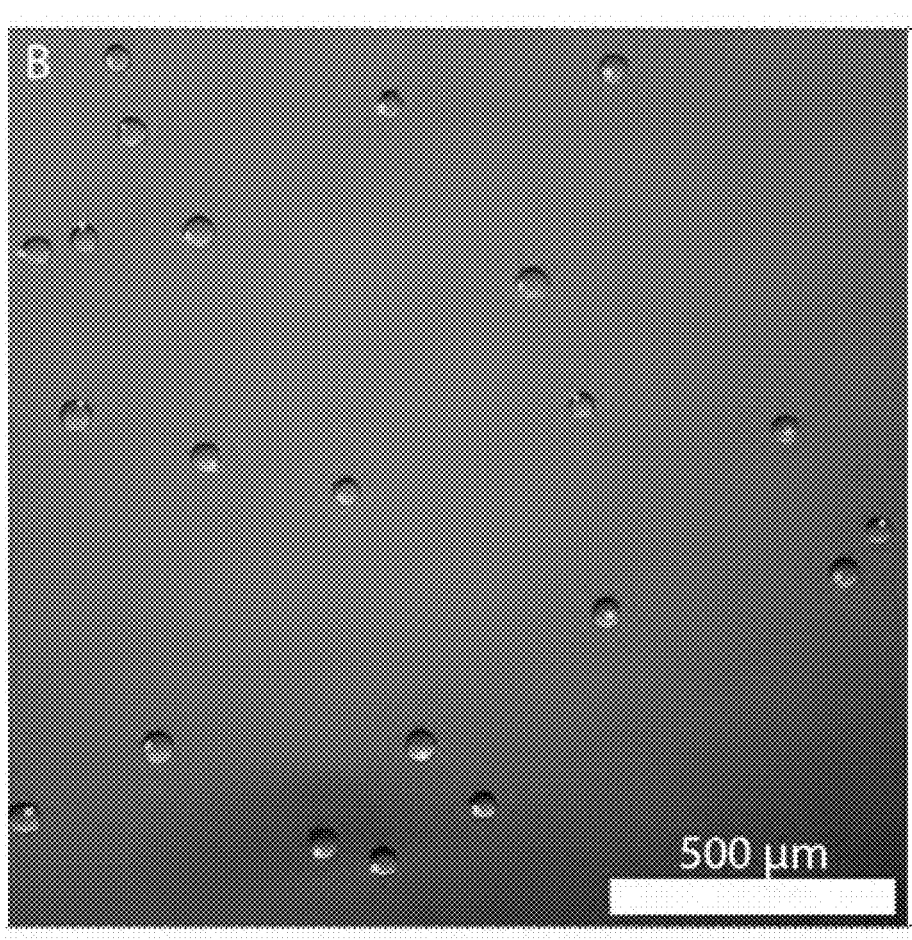
Figure 7C:
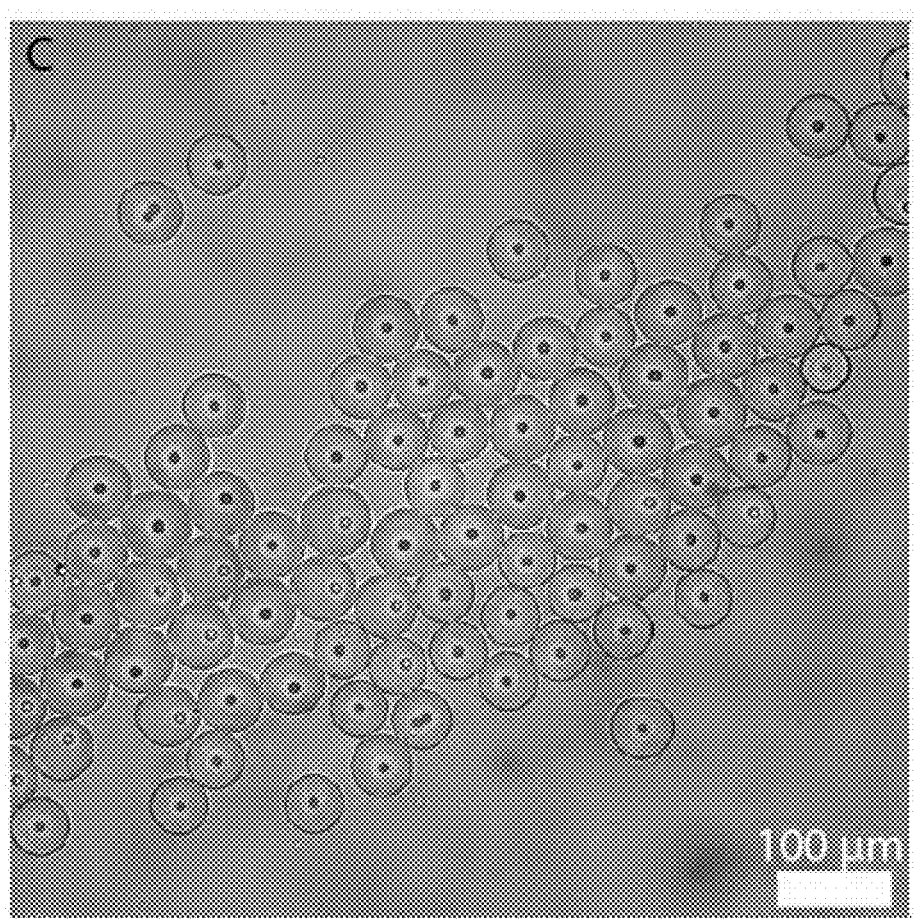

To test system performance, microfluidic chips described herein including two sort junctions, four sort junctions, and nine sort junctions were tested. The microfluidic chips were tested to sort calibration beads and labelled cells in droplets. In this example, droplets were sorted into sort channels and then provided to a sort outlet port. The sorted droplets were collected in a sort collection tube via microbore tubing (poly ether ether ketone (PEEK) tubing having 125 micron inner dimeter PEEK tubing). FIG. 7A-C show examples of fluorescent beads sorted, collected, and observed under a microscope. FIG. 7A shows droplets from a sort experiment collected in a haemocytometer. FIG. 7B shows sorted droplets tagged with Invitrogen Alexa Fluor 447 dye (pseudo color) overlaid on a bright field image collected from a microfluidic chip including four sort junctions. FIG. 7C shows sorted droplets tagged with Invitrogen Alexa Fluor 647 fluorescent beads (pseudo color) collected from a microfluidic chip including four sort junctions. Purity measurements on sorted droplets were made by either manual counting in a haemocytometer under a microscope or breaking the emulsion, pipetting the aqueous fraction, and running the aqueous portion on a flow cytometer.

Figure 8A:
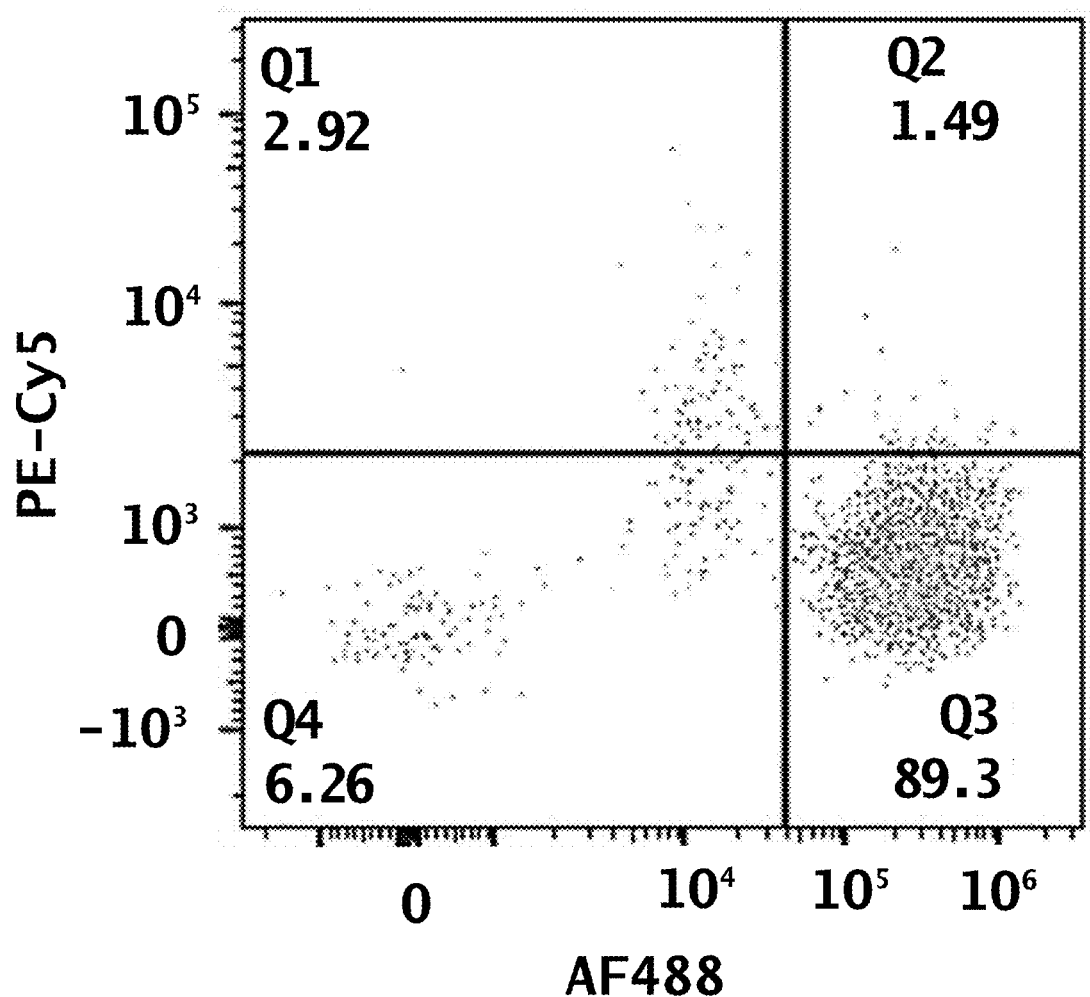
FIGS. 8A and 8B is an illustration of a micrograph showing a 9-sort junction channels according to an embodiment described herein.
Figure 8B:
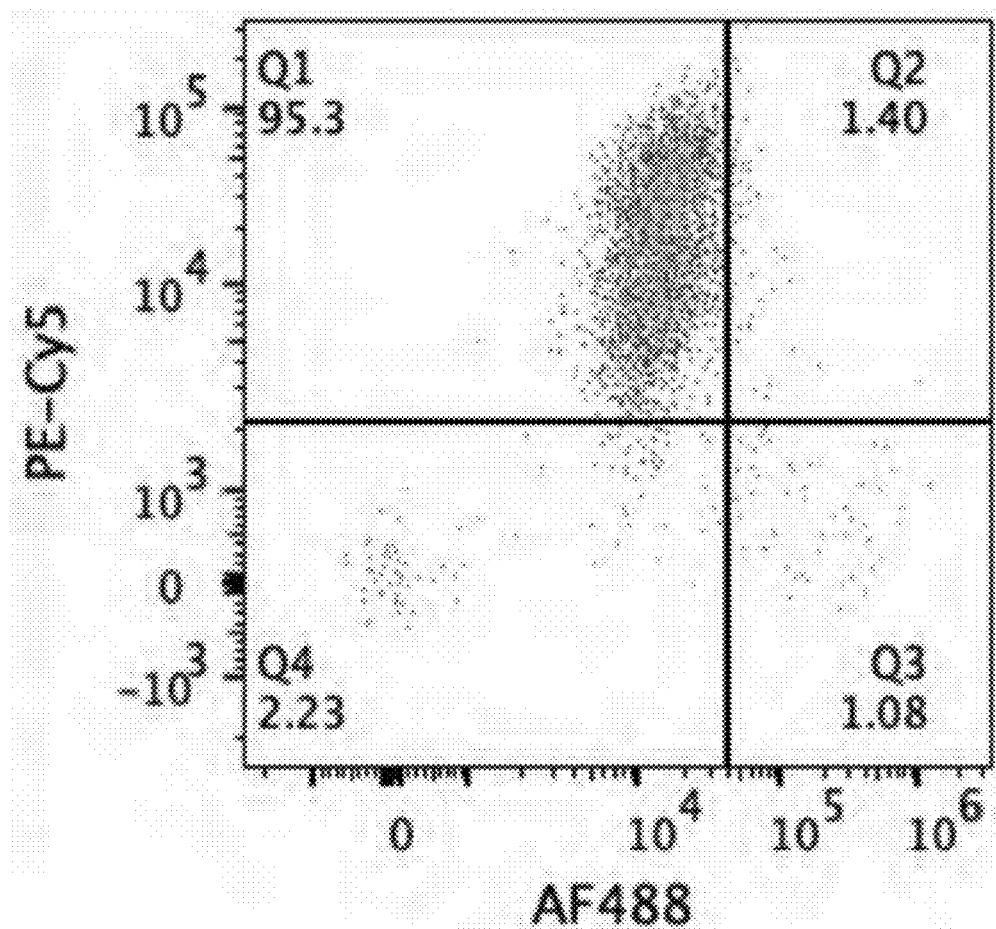

FIGS. 8A and 8B show an experiment where red and green labelled cells were sorted in a microfluidic chip including two sort junctions. The particles that were sorted were GM12878 cells and CD45 antibodies labelled with AF488 or PE-Cy5. The labelled cells were mixed in approximately 1:1 ratio, with each type filling about 2% of the droplets. The droplets were suspended in an oil medium and sorted in an injection-molded microfluidic chip into one of the two sort junctions. Specifically, using fluorescence signals, the particles were each sorted into a separate sorting channel. These sorted droplets including cells were collected. The emulsion of oil containing the sorted droplets were broken using corona discharge, and aqueous phase of the droplets were reflown in a flow cytometer along with controls. From FIGS. 8A and 8B, we see that the final measured purity was about 89% for cells labelled with AF-488 and 95% for cells labelled with Pe-Cy5 in this experiment.

Figure 9A:
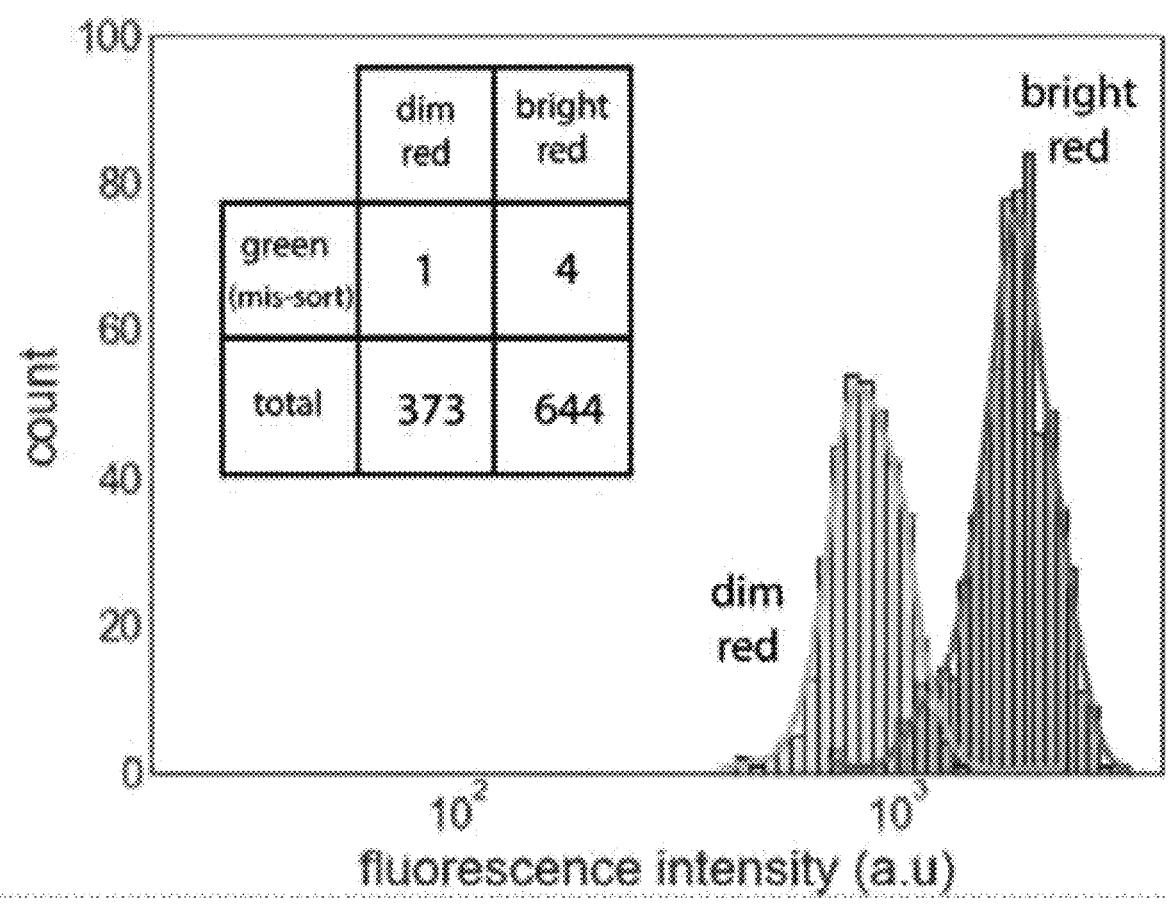
FIGS. 9A and 9B provides a snapshot of a sorting region including 17 sort junctions according to some embodiments.
Figure 9B:
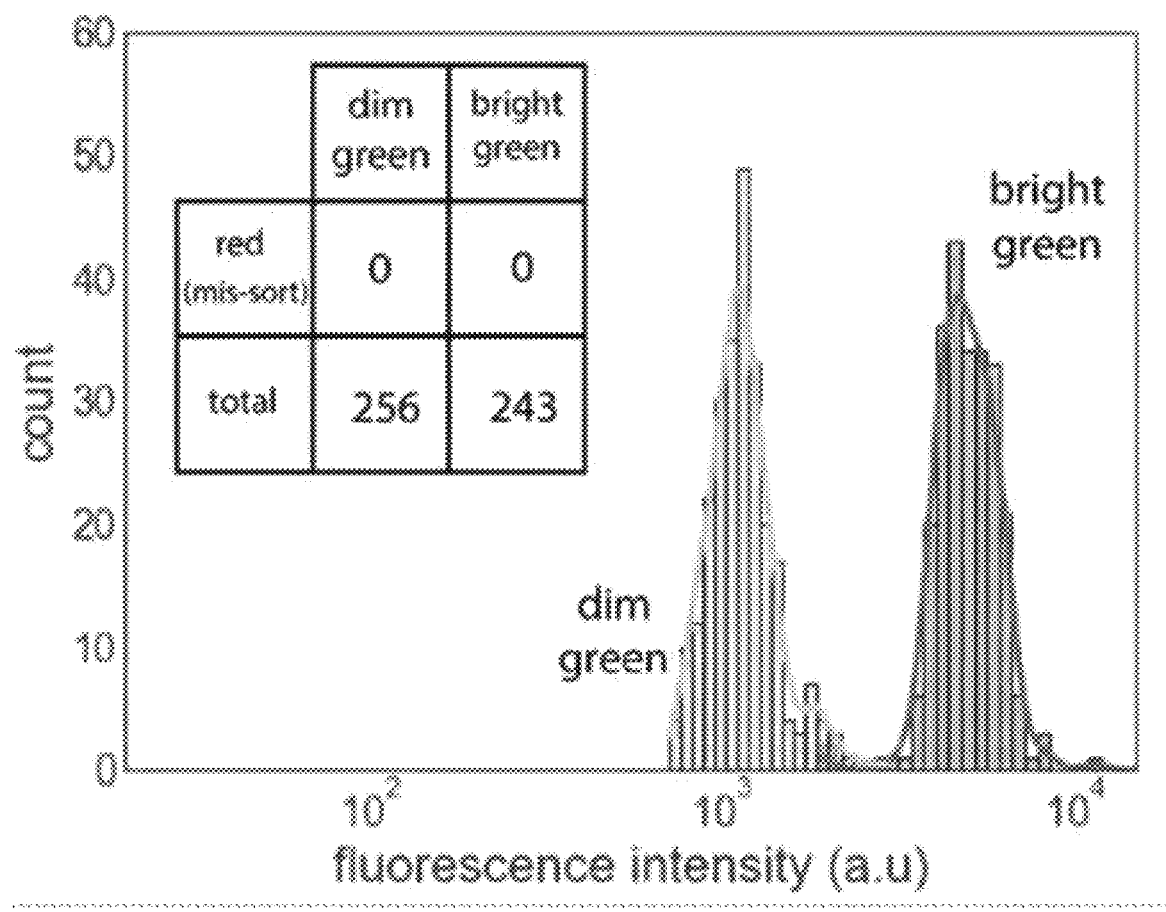

FIGS. 9A and 9B show an experiment using a microfluidic chip including two sort junctions. The droplets are filled with red and green beads of two different intensities (Quantum™ Alexa Fluor® 488 MESF and Quantum™ Alexa Fluor® 647 MESF 3 and 4 from Bangs Laboratories, Inc,), which is labeled as dim or bright in the figures. Each of the droplets were sorted into each of the four sorting channels. Each bead type was present at a droplet filling ratio of approximately 2%. The sorted droplets with beads were collected from the sorting channel outlet using sort tubes into a haemocytometer. The fluorescence was evaluated by processing the images. FIGS. 9A and 9B shows microfluidic chip sorted out the dimmer and brighter fluorescence droplets in both the colors. The inset tables count the color errors (green for red or vice versa) corresponding to each sort outlet. The sorting ability for different spectra (i.e., red/green) is better than sorting ability of different intensities of the same spectra.

Example 2

Another bead sort experiment with rainbow beads (Spherotech Ultra-rainbow, 5 fluorescence levels) was performed on a microfluidic chip including nine sorting junctions, with only five of the sorting channel outputs used. The sort purity is shown in Table 1 (as measured using a separate flow cytometer). In this experiment, sorting was done based on maximum fluorescence intensity from the droplet. Each rainbow bead level filled about 2% to 3% of the volume of the droplets.

TABLE 1

| Type | Sort Output 1 (%) | Sort Output 2 (%) | Sort Output 3 (%) | Sort Output 4 (%) | Sort Output 5 (%) |
| --- | --- | --- | --- | --- | --- |
| Level 5 | 91.4 | 0.9 | 0.2 | 0 | 0 |
| Level 4 | 2.2 | 91.3 | 0.3 | 0 | 0 |

TABLE 1-continued

| Type | Sort Output 1 (%) | Sort Output 2 (%) | Sort Output 3 (%) | Sort Output 4 (%) | Sort Output 5 (%) |
|---|---|---|---|---|---|
| Level 3 | 2.4 | 2.9 | 95.0 | 1.1 | 0.1 |
| Level 2 | 2.1 | 2.7 | 2.2 | 96.0 | 1.7 |
| Level 1 | 1.9 | 2.2 | 2.3 | 2.9 | 98.1 |

When the filling fraction is small, the distribution of beads in droplets is known to approximate a Poisson distribution. If n is the random variable representing the (discrete) number of beads in a droplet, then the probability of n=k beads in a drop is given by:

$$P(n=k) = \frac{\lambda^k e^{-\lambda}}{k!},$$

where λ can be identified as the average filling fraction. For example, if the average filling fraction is 5%, λ=0.05 and the probability of 2 similar beads in a drop is P(n=2)=0.0119. On the other hand, the probability of a drop containing 2 beads of different types, for example, A and B, is PA(n=1) PB(n=1).

Since particles were sorted using the maximum sorting intensity, any droplet containing two beads of different intensities will be sorted into the channel for the higher intensity bead, e.g. a drop containing level 5 and level 3 beads will be sorted into the sort channel for level 5 (5 having higher fluorescence), carrying the level 3 bead as a contaminant. For these level 5 sorted drops, the contamination from level 3 will be PLevel 3(n=1) which is approximately the filling percentage for level 3. Hence, level 5 sort outlet will contain about 2-3% contamination each from level 4, level 3, level 2 and level 1 beads. On the other hand, the sort outlet for level 3 should not contain any doublet contamination from level 5 and level 4 beads, but will have contamination from level 2 and level 1. This is in line with the numbers seen in Table 2; the sort purity increases as the beads get dimmer because there is less contamination from beads of higher fluorescence. The remaining impurities are mostly a result of the limits of optical detection and flow cytometer carryover.

More generally, the sorting purity in our system depends on two things: 1) sorting accuracy of the electrodes; and 2) optical detection. It was unexpectedly found that the electrode sorting accuracy for the microfluidic device can be on par or exceed that of high speed flow sorters because the fluids are moving at an order of slower velocity (~0.1 m s−1), thus providing the ability to sort individual droplets precisely. However, when distinguishing entities with varying fluorescence intensities in the same channel, optical detection can be limited due to the signal to noise ratio and doublets. Signal to noise is a function of background noise, quality of optics/electronics and the level of signal dispersion caused by varying bead location and velocity inside a drop. Doublets that cause mis-sorting as described previously can also cause obscuration, where one bead obscures another, preventing detection. These effects contribute to reduction of final sort purity. Despite these limitations, the microfluidic devices achieved sorting at purity that exceeded 90% in most experiments, with the highest purity exceeding 99.5% when sorting entities with fluorescence in different channels. Besides sorting for purity, it is also possible to enrich a rare population and setting parameters such that droplets may still be sorted.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method of producing a microfluidic sorting apparatus, the method comprising:
providing an injection-molded substrate comprising a network of channels, wherein the network of channels comprises a plurality of sort junctions, wherein each of the plurality of sort junctions comprises a primary channel connected to a sorting outlet channel and a medium supply channel, and wherein the network of channels further comprises an electrode channel, wherein the electrode channel is adjacent each sorting outlet channel;
bonding an insulating film to an upper surface of the substrate to cover the network of channels; and
depositing a conductive film on the insulating film to produce a ground film for each electrode channel;
wherein the substrate is separated and distinct from the conductive film.

2. The method of claim 1, further comprising producing the insulating film.

3. The method of claim 2, wherein producing the insulating film comprises:
dissolving a polymer in a solvent; and
spinning the polymer onto a glass substrate to form the insulating film.

4. The method of claim 3, further comprising peeling the insulating film from the glass substrate.

5. The method of claim 1, wherein bonding the insulating film to the substrate comprises hot pressing the insulating film onto the substrate.

6. The method of claim 1, wherein the insulating film comprises a polymer having a lower glass transition temperature than the substrate.

7. The method of claim 1, wherein the substrate comprises a first cyclic olefin copolymer and the insulating film comprises a second cyclic olefin copolymer.

8. The method of claim 7, wherein the first cyclic olefin copolymer is different from the second cyclic olefin copolymer.

9. The method of claim 7, wherein the first cyclic olefin copolymer is the same as the second cyclic olefin copolymer.

10. The method of claim 1, wherein providing an injection-molded substrate comprises:
providing a mold;
depositing a cyclic olefin polymer on the mold;
curing the cyclic olefin polymer to form the substrate; and
removing the substrate from the mold.

11. The method of claim 1, wherein the electrode channel comprises an ionic liquid.

12. The method of claim 1, wherein the medium supply channel may be disposed on a side of the primary channel opposite the sorting outlet channel.

13. A method of sorting particles, the method comprising:
providing a microfluidic chip comprising:
a substrate comprising a first inlet and a second inlet;

a network of channels, wherein the network of channels comprise a plurality of sort junctions, wherein each of the plurality of sort junctions comprises a primary channel connected to a sorting outlet channel and a medium supply channel;

and wherein said network of channels further comprises an electrode channel adjacent the sorting outlet channel;

an insulating film disposed above and covering the network of channels of the substrate; and a conductive film disposed on the insulating film forming a ground film for each of the electrode channels;

passing a medium containing a plurality of particles through a primary channel at a selected volumetric flow rate to an optical detection sensor to sense at least a subset of the particles; and sorting the sensed subset of particles into the sorting outlet channel of one of the plurality of sorting junctions.

14. The method of claim 13, wherein sorting comprises sorting the sensed subset of particles from the primary channel into the sorting channel.

15. The method of claim 13, further comprises reinjecting a medium devoid of particles from the medium supply channel into the primary channel, wherein the reinjection of the medium from the medium supply channel maintains the selected volumetric flow rate in the primary channel.

16. The method of claim 13, wherein the selected volumetric flow rate controls inter-particle spacing, inter-particle timing, particle positioning, or any combination thereof, within at least the primary channel.

17. The method of claim 13, wherein the substrate is an injection-molded substrate.

18. The method of claim 13, wherein the particles are sorted into a sorting outlet channel of one of the plurality of sorting junctions.

19. A microfluidic particle sorting apparatus, the apparatus comprises:

an injection-molded substrate comprising a first inlet and a second inlet;

a network of channels, wherein the network of channels comprise a plurality of sort junctions, wherein each of the plurality of sort junctions comprise a primary channel connected to a sorting outlet channel and a medium supply channel;

and wherein said network of channels further comprises an electrode channel adjacent the sorting outlet channel;

an insulating film disposed above the network of channels of the substrate; and a conductive film disposed on the insulating film, wherein the conductive film is configured to form a ground film for each of the electrode channels.

20. The apparatus of claim 19, wherein the injection-molded substrate comprises a cyclic olefin copolymer.

21. The apparatus of claim 19, wherein the insulating film comprises a cyclic olefin copolymer, wherein the injection-molded substrate and the injection-molded substrate comprise the same material.

22. The apparatus of claim 19, wherein the electrode channel comprises an ionic liquid.

23. The apparatus of claim 19, wherein the conductive film comprises a metal or a polymer.

24. The apparatus of claim 19, wherein the first inlet is configured to receive a sample fluid and the second inlet is configured to receive an oil.

25. The apparatus of claim 19, further comprising:

a nozzle downstream from the first inlet and the second inlet to produce droplets including the particles; and an optical detection unit downstream from the nozzle, the detection unit configured to detect particles of interest by detecting scattered light or fluorescence generated from the particles when the particle is illuminated.

26. The apparatus of claim 25, wherein the droplets formed at the nozzle flow to the optical detection unit.

27. The apparatus of claim 25, wherein the electrode channel is configured to apply a force for changing a flow direction to the particles which flow in a flow path of the primary channel based on a signal from the optical detection unit.

* * * * *